United States Patent
Kaku

(10) Patent No.: US 9,956,476 B2
(45) Date of Patent: May 1, 2018

(54) COMMUNICATION TERMINAL, COMMUNICATION METHOD, COMMUNICATION PROGRAM, RECORDING MEDIUM STORING THE COMMUNICATION PROGRAM, AND INFORMATION PROCESSING APPARATUS

(71) Applicant: PIONEER CORPORATION, Kawasaki-shi, Kanagawa (JP)

(72) Inventor: Fuminobu Kaku, Kawagoe (JP)

(73) Assignee: PIONEER CORPORATION, Kanagawa (JP)

( * ) Notice: Subject to any disclaimer, the term of this patent is extended or adjusted under 35 U.S.C. 154(b) by 365 days.

(21) Appl. No.: 14/429,905

(22) PCT Filed: Sep. 25, 2012

(86) PCT No.: PCT/JP2012/074498
§ 371 (c)(1),
(2) Date: Mar. 20, 2015

(87) PCT Pub. No.: WO2014/049681
PCT Pub. Date: Apr. 3, 2014

(65) Prior Publication Data
US 2015/0217186 A1 Aug. 6, 2015

(51) Int. Cl.
*A63F 13/00* (2014.01)
*A63F 9/18* (2006.01)
(Continued)

(52) U.S. Cl.
CPC .............. *A63F 9/183* (2013.01); *A63F 13/12* (2013.01); *A63F 13/35* (2014.09); *H04L 67/10* (2013.01);
(Continued)

(58) Field of Classification Search
CPC ........ A63F 13/21; A63F 13/216; A63F 13/30; A63F 13/33; A63F 13/34
(Continued)

(56) References Cited

U.S. PATENT DOCUMENTS

| | | | |
|---|---|---|---|
| 2012/0225705 A1* | 9/2012 | Rhodes, Jr. | A63F 9/24 463/9 |
| 2013/0225297 A1* | 8/2013 | Bautista | G06Q 30/0209 463/42 |

(Continued)

FOREIGN PATENT DOCUMENTS

| | | |
|---|---|---|
| JP | 2002-325976 A | 11/2002 |
| JP | 2003-038854 A | 2/2003 |

(Continued)

OTHER PUBLICATIONS

Crowdpark Announces New Games "Pet Vegas" & "AnteUp"—Strengthens Position in Social Betting Games, [online], Feb. 28, 2012, [retrieval date Dec. 20, 2012 (Dec. 20, 2012)], Internet <URL:http://www.crowdpark.com/media-kit/crowdpark-press-releases/crowdpark-casino-enpress-release-02.28.12.pdf>.

(Continued)

Primary Examiner — James S McClellan
(74) Attorney, Agent, or Firm — Sughrue Mion, PLLC

(57) ABSTRACT

A communication terminal receives information such as game information of a quiz including a predetermined question and an answer, a sender, goods or service, and a store offering the goods or the service from a communication terminal with a network communication unit. A CPU of the communication terminal judges whether an answer input from an input unit such as a touch panel or a microphone is correct. The communication terminal receives a location for receiving the goods or the service when playing the game.

11 Claims, 16 Drawing Sheets

(51) Int. Cl.
*A63F 13/30* (2014.01)
*A63F 13/35* (2014.01)
*H04L 29/08* (2006.01)

(52) U.S. Cl.
CPC ............... *A63F 2300/5573* (2013.01); *A63F 2300/8064* (2013.01); *H04L 67/18* (2013.01)

(58) Field of Classification Search
USPC .......................................... 463/42
See application file for complete search history.

(56) References Cited

U.S. PATENT DOCUMENTS

2013/0237304 A1* 9/2013 Oakes ..................... G07F 17/32
463/16
2016/0358283 A1* 12/2016 Regala ................... A63F 13/30

FOREIGN PATENT DOCUMENTS

| | | |
|---|---|---|
| JP | 2006-243229 A | 9/2006 |
| JP | 2010-104695 A | 5/2010 |
| JP | 2012-130671 A | 7/2012 |

OTHER PUBLICATIONS

International Search Report of PCT/JP2012/074498 dated Jan. 8, 2013 [PCT/ISA/210].

* cited by examiner

FIG. 2

| POI ID | POI DETAILS | | | | | | | | |
|---|---|---|---|---|---|---|---|---|---|
| | NAME | ADDRESS | ZIP CODE | PHONE NUMBER | RATING | LAT | LNG | MENU1 | MENU2 | ... |
| p1001 | TORATTORIA A | DOWNTOWN, LOS ANGELES, CA | 90189 | (714) 634-5789 | 4 | 34.052282 | -118.242782 | BEER | PIZZA | ... |
| p1002 | JAPANESE RESTAURANT B | 624 W 6TH, LOS ANGELES, CA | 90017 | (216) 345-7890 | 4.5 | 34.049312 | -118.255789 | BEER | YAKITORI | ... |
| p1003 | | | | | | | | | | |
| p1004 | | | | | | | | | | |

FIG. 3

| GAME ID | GAME DETAILS ||||||||| |
| | DATE(Q) | QUESTIONER | DATE(A) | ANSWERER | QUESTION | CORRECT ANSWER | ACTUAL ANSWER | CORRECT? | ... | POI ID | GOODS TO BET | PAID DATE |
|---|---|---|---|---|---|---|---|---|---|---|---|---|
| g1001 | 3-AUG-12 | u08422 | 4-AUG-12 | u02348 | YESTERDAY, ACCIDENT ... | NO.3 | NO.2 | FALSE | ... | p1301 | PIZZA | |
| g1002 | 6-AUG-12 | u01723 | 6-AUG-12 | u05529 | WHAT FOOD WILL I EAT ... | NO.4 | NO.4 | TRUE | ... | P1001 | BEER | 7-AUG-12 |
| g1003 | | | | | | | | | | | | |
| g1004 | | | | | | | | | | | | |

FIG. 7A

POI DETAILS

| POI ID | NAME | ADDRESS | ZIP CODE | PHONE NUMBER | RATING | LAT | LNG | SUB CATEGORY | MAIN CATEGORY | ... |
|---|---|---|---|---|---|---|---|---|---|---|
| p2001 | A PIZZERIA | DOWNTOWN, LOS ANGELES, CA | 90189 | (714) 634-5789 | 4 | 34.052282 | -118.242782 | ITALIAN | RESTAURANTS | ... |
| p2002 | BECK'S BURGER | 888 N ALAMADA ST, LOS ANGELES,CA | 90012 | (116) 345-7890 | 3.5 | 34.054763 | -118.233614 | BURGERS | RESTAURANTS | ... |
| p2003 | THEATER C | 107 W 2ND ST, LOS ANGELES,CA | 90012 | (116) 345-7899 | 3 | 34.051004 | -118.245011 | THEATER | EVENTS | |
| p2004 | D'S PIANO BAR | 420 E 2ND ST, LOS ANGELES,CA | 90012 | (116) 345-7899 | 4 | 34.046931 | -118.238751 | CONCERTS | EVENTS | |
| ... | | | | | | | | | | |

FIG. 7B

| CATEGORY ID | CATEGORY | MENU1 | MENU2 | ... |
|---|---|---|---|---|
| c1001 | RESTAURANTS | BEER | COFFEE | ... |
| c2001 | EVENTS | ADMISSION FEE | - | ... |
| c1101 | ITALIAN | WINE | PIZZA | |
| c1102 | BURGERS | POTATO | - | |
| c2101 | THEATER | CHIPS | - | |
| c2102 | CONCERTS | BEER | - | |
| ... | | | | |

MESSAGE FROM BOB
[PHOTO] THE MESSAGE WITH THE QUIZ GAME IS RECEIVED FROM A FRIEND, BOB.

GAME DESCRIPTION
BOB BETS "JAPANESE RESTAURANT A" AND "BEER" FOR THE GAME.
IF YOUR ANSWER IS CORRECT, YOU WIN BEER FROM BOB. AND IF YOUR ANSWER IS NOT CORRECT, YOU GIVE BEER TO BOB.

QUESTION MESSAGE
WHICH ONE DO I FIRST EAT A CUISINE AT THIS JAPANESE RESTAURANT? 1. SUSHI 2. TEMPURA 3. YAKITORI I BET A GLASS OF BEER!

SELECTED POI
JAPANESE RESTAURANT A
[PHOTO]  ADDRESS
         PHONE NUMBER
         RATING

REGISTERED GOODS TO BET
BEER

DO YOU PLAY THE GAME?
[YES] [NO]

(b)

QUESTION MESSAGE
WHICH ONE DO I FIRST EAT A CUISINE AT THIS JAPANESE RESTAURANT? 1. SUSHI 2. TEMPURA 3. YAKITORI I BET A GLASS OF BEER!

ENTER YOUR ANSWER
[3]
[OK]

(c)

YOUR ANSWER IS
[3]

FINAL ANSWER?
[YES] [NO]

(d)

YOU WIN !!

CORRECT ANSWER IS [3]

[PHOTO] MESSAGE FROM BOB
YOU WIN. I SET UP A GLASS OF BEER. HOW ABOUT THIS WEEKEND?

POI
JAPANESE RESTAURANT A
[PHOTO]  ADDRESS
         PHONE NUMBER
         RATING

REGISTERED GOODS TO BET
BEER

[OK]

FIG. 13
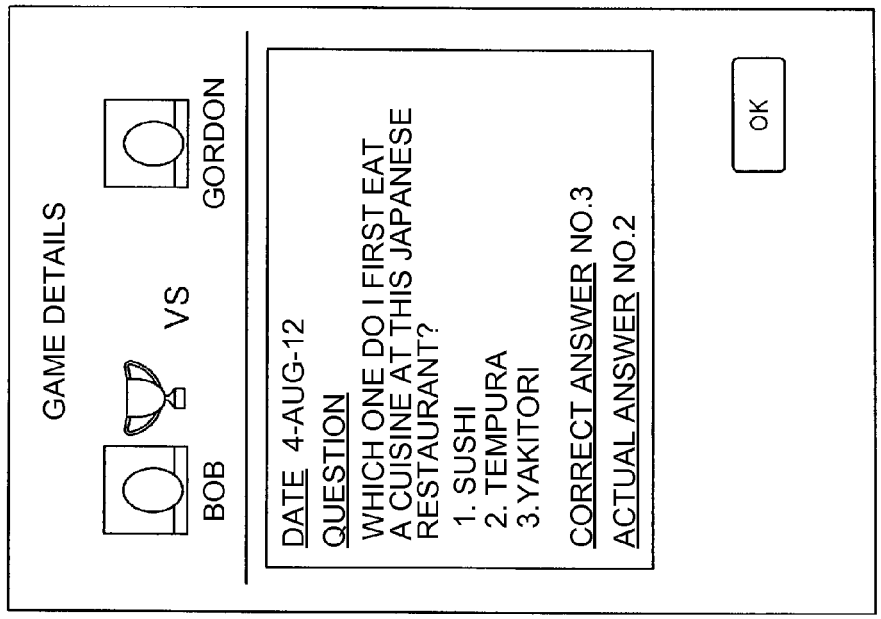

COMMUNICATION TERMINAL, COMMUNICATION METHOD, COMMUNICATION PROGRAM, RECORDING MEDIUM STORING THE COMMUNICATION PROGRAM, AND INFORMATION PROCESSING APPARATUS

CROSS REFERENCE TO RELATED APPLICATIONS

This application is a National Stage of International Application No. PCT/JP2012/074498, filed Sep. 25, 2012, the contents of which are incorporated herein by reference in its entirety.

TECHNICAL FIELD

The present invention relates to a communication terminal communicably connected via a network to at least one another communication terminal, a communication method, a communication program, a recording medium storing the communication program, and an information processing apparatus such as a server communicably connected via the network to the communication terminals.

BACKGROUND ART

In recent years, game machines have a communication function to play a match-type game with another game machine via a network. Further, a smartphone can make a game with other smartphones via the network by installing a program such as a game application.

Further, a content of the match-type game is not limited to a packaged game software, but a quiz set by one another is proposed as disclosed in Patent Document 1.

Patent Document 1 discloses that a questioner registers a question, selection of correct or incorrect answer, and an answerer to a server with operation of an information terminal. When the answerer plays a game with a game machine connected to the server, the server sets the registered question and registers a result of the answer.

CITATION LIST

Patent Literature

JP 2010-104695 A

SUMMARY OF INVENTION

Technical Problem

Users may bet some articles among them for a win-loss result of a game. For example, in the case of the quiz described above, when a user A sets a question to a user B, the user A treats a meal to the user B when the answer is correct, and the user A receives the meal from the user B when the answer is incorrect.

In the above game, the result of the bet itself is obtained from the win-loss result of the game. A reward (treat of meal) or a reward paying place (place for meal) for the win-loss result is not determined from the result of the game. A specific content of the reward and the place is separately determined between the players.

When the players stay away from each other, it is necessary to communicate each other with a communication tool such as telephone, mail or messenger software, so that the players need cumbersome procedure.

An object of the present invention is to provide a communication terminal, a communication method, a communication program, a recording medium storing the communication program, and an information processing apparatus in order to decide a reward or a reward paying place for a win-loss result from a bet of a match-type game.

Solution to Problem

According to a first aspect of the present invention, a communication terminal communicably connected via a network to at least one another communication terminal, the communication terminal comprising: first receiving means for receiving match-type game information, opponent information, reward information, and location information of a reward paying place from the another communication terminal; first inputting means for inputting acceptance of the match-type game in the match-type game information acquired by the first receiving means; first win-loss result acquiring means for acquiring a win-loss result of the match-type game; and game result outputting means for outputting the match-type game information, the opponent information, the reward information, the location information, and the win-loss result.

According to a second aspect of the present invention, a communication method of a communication terminal communicably connected via a network to at least one another communication terminal, the method comprising: a first receiving step for receiving match-type game information, opponent information, reward information, and location information of a reward paying place from the another communication terminal; a first inputting step for inputting acceptance of the match-type game in the match-type game information received in the first receiving step; a first win-loss result acquiring step for acquiring a win-loss result of the match-type game; and a game result outputting step for outputting the match-type game information, the opponent information, the reward information, the location information, and the win-loss result.

According to a third aspect of the present invention, a communication terminal communicably connected via a network to at least one another communication terminal, the communication terminal comprising: game assigning means for assigning a match-type game to play with the another communication terminal; opponent assigning means for assigning an opponent to play the match-type game; reward assigning means for assigning a reward for a result of the match-type game; paying place assigning means for assigning a paying place of the reward; second transmitting means for transmitting match-type game information assigned by the game assigning means, opponent information assigned by the opponent assigning means, reward information assigned by the reward assigning means, location information of reward paying place assigned by the paying place assigning means; second inputting means for inputting to play the match-type game assigned by the game assigning means; and second win-loss result acquiring means for acquiring a win-loss result of the match-type game.

According to a fourth aspect of the present invention, a communication method of a communication terminal communicably connected via a network to at least another communication terminal, the communication method comprising: a game assigning step for assigning a match-type game to play with the another communication terminal; an opponent assigning step for assigning an opponent to play the match-type game; a reward assigning step for assigning a reward as a result of the match-type game; a paying place assigning step for assigning a place to pay the reward; a second transmitting step for transmitting match-type game information assigned by the game assigning step, opponent information for notifying an opponent to play the match-type game assigned by the opponent assigning step, reward information assigned by the reward assigning step, and location information of the paying place of the reward assigned by the paying place assigning step; a second inputting step for inputting to play the match-type game assigned by the game assigning step; and a second win-loss result acquiring step for acquiring a win-loss result of the match-type game.

BRIEF DESCRIPTION OF DRAWINGS

FIG. 2 is a table showing an example of a configuration of a POI database of FIG. 1.

FIG. 3 is a table showing an example of a configuration of a game result detail database of FIG. 1.

FIGS. 7A and 7B are tables showing another example of a configuration of the POI database of FIG. 1.

FIG. 9 is a diagram showing an example of transition of a screen of the answerer terminal of FIG. 1.

FIG. 13 is a diagram showing an example displaying a win-loss result in a map and a detail thereof on the communication terminal of FIG. 1.

DESCRIPTION OF EMBODIMENTS

Figure 1:
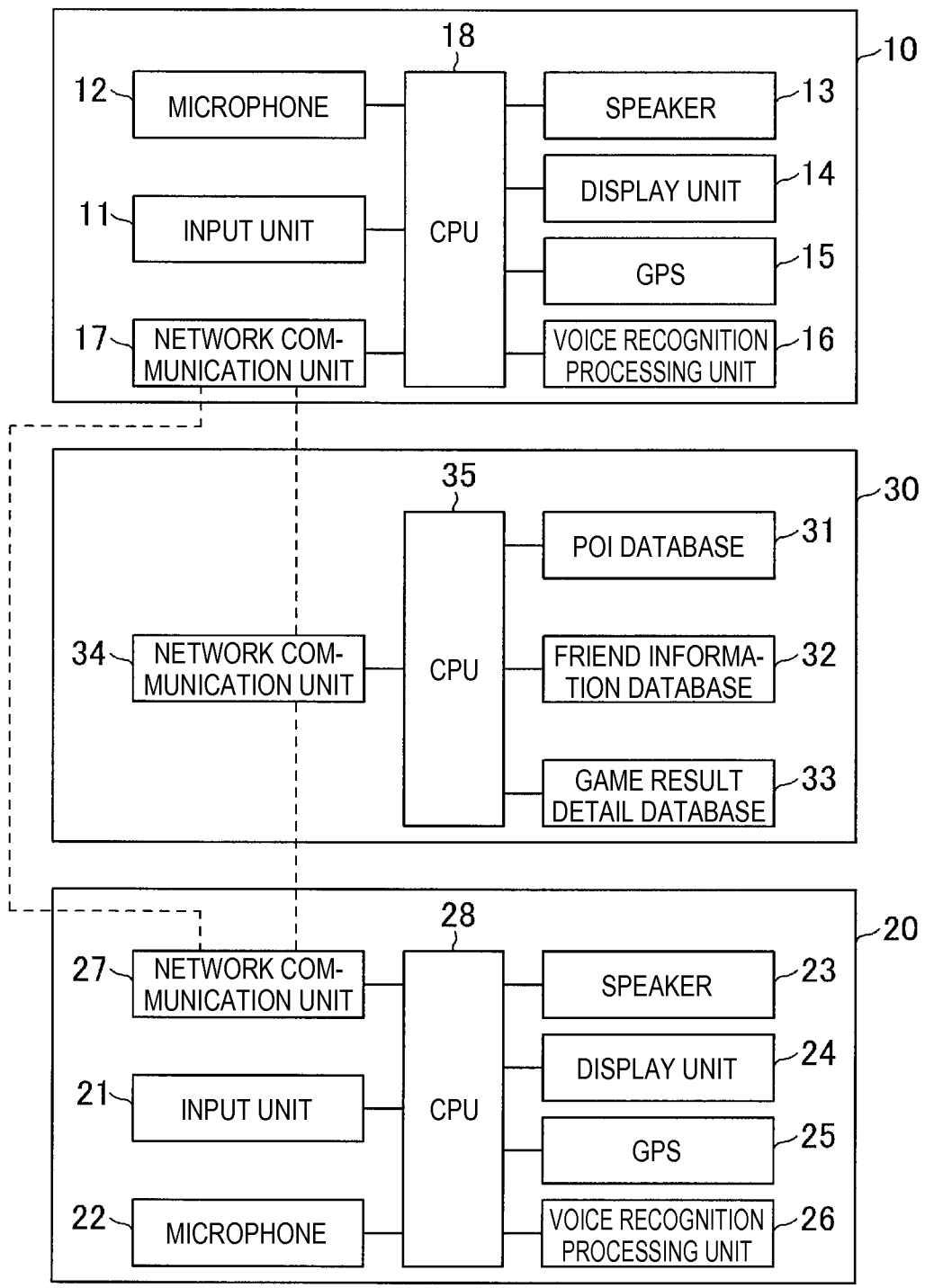
FIG. 1 is a configuration diagram of a communication terminal and a server of a first embodiment of the present invention.

According to a communication terminal of an embodiment of the present invention, first receiving means receives match-type game information, opponent information, reward information, and location information of a reward paying place from the another communication terminal; first inputting means inputs acceptance of the match-type game in the match-type game information acquired by the first receiving means; first win-loss result acquiring means acquires a win-loss result of the match-type game; and game result output means outputs the match-type game information, the opponent information, the reward information, the location information, and the win-loss result. Thereby, the communication terminal receives the reward and the paying place when the game is played. It is not necessary for players to decide the reward and the paying place with the mutual communication. The communication terminal can specifically image the reward and the paying place when the communication terminal accepts the match-type game of the bet from the another communication terminal.

The reward paying place is a commercial facility, the location information includes information of the commercial facility, and the reward information includes information of a goods or a service offered by the commercial facility. Thereby, the match-type game assigns the goods or the service of the commercial facilities for the bet. The players visit the pertinent commercial facility after the game. Therefore the commercial facilities can increase the customers.

The match-type game information is quiz information including a predetermined question information and a correct answer thereof. First outputting means outputs the predetermined question information. The first win-loss result acquiring means includes first judging means for judging a correct or an incorrect answer based on the correct answer information received from the first receiving means and the answer information input by the first inputting means for the predetermined question. Thereby, the match-type bet game utilizes the quiz questioned from the another communication terminal.

The first receiving means receives a correct answer message for the correct answer and an incorrect message for the incorrect answer to the predetermined question with the match-type game information, and the first outputting means outputs either the correct answer message or the incorrect answer message based on the correct or incorrect answer judged by the first judging means. Thereby, the communication terminal outputs the correct answer message or the incorrect answer message assigned by the questioner. Thus, the questioner can notify the correct or the incorrect answer of the quiz.

First map data acquiring means acquires a map data, and first game record acquiring means acquires the location information and the win-loss result at the location information after the first win-loss result acquiring means acquires the win-loss result. The first outputting means outputs information indicating the win-loss result on the location indicated by the location information on the map data based on the map data, and the location information and the win-loss result acquired by the first game record acquiring means. Thereby, the communication terminal indicates an icon showing the win-loss result on the place assigned as the reward paying place on the map in order to confirm easily the matching result.

First current location information acquiring means acquires current location information indicating one's own current location. The first game record acquiring means acquires the reward information, and the first outputting means outputs the win-loss result and the location information acquired by the first game record acquiring means, and the reward information when a distance between the current location information and the location information acquired by the first game record acquiring means is within a predetermined distance. Thereby, the communication terminal prompts the players to visit the reward paying place when they are present near the place. Thus, the commercial facilities can increase the customers.

First destination setting means sets a destination, and first guiding means guides a path from the location indicated by the current location information to the destination based on the map data. The first destination setting means sets the location indicated by the location information as the destination when the win-loss result is acquired by the first win-loss result acquiring means, and the first guiding means guides the path. Thereby, the communication terminal implicitly guides the players to visit the reward paying place after the win-loss result of the match-type game is attained.

The first game record acquiring means acquires the opponent information, the first receiving means receives an opponent location information indicating a location of the another communication terminal corresponding to the opponent information, and the first outputting means outputs information indicating the paying of the reward possible when the communication terminals are within the predetermined distance based on the current location information and the opponent location information. Thereby, the communication terminal notifies that the paying of the reward is possible when the players are present near each other.

The first outputting means outputs notification to prompt input of information whether the reward is paid or not when the respective communication terminals are present within the predetermined distance based on the current location information and the opponent location information after the first win-loss result acquiring means acquires the win-loss result, and outputs information indicating the reward paid when the information indicating the reward paid is input by the first inputting means. Thereby, the communication terminal prompts to input the information indicating the reward paying possible when the players are present near each other and the reward is not paid in order to prompt paying the reward.

The first receiving means receives information indicating a utilization status of a bet for the match-type game at the location indicated by the location information, and the first outputting means outputs information indicating the utilization status of the bet for the match-type game received by the first receiving means on the location indicated by the location information on the map data. Thereby, the communication terminal indicates the utilization status of the bet for the match-type game between oneself and the opponent from the location information.

An information processing apparatus communicably connected via a network to the communication terminal described above includes game result storing means for storing the match-type game information, the opponent information, the reward information, the location information, and the win-loss result output by the game result outputting means, and a first control unit for storing each information output by the game result outputting means to the game result storing means and for searching each information upon request from the first game record acquiring means. Thereby, the information processing apparatus registers the match-type game and the content of the match-type bet game and includes the record for reference. Thereby, the information processing apparatus allows that the communication terminal needs not store the record of the game and have the large capacity of the memory device.

A first receiving step receives match-type game information, opponent information, reward information, and location information of a reward paying place from the another communication terminal, a first inputting step inputs acceptance of the match-type game in the match-type game information received in the first receiving step, a first win-loss result acquiring step acquires a win-loss result of the match-type game, and a game result outputting step outputs the match-type game information, the opponent information, the reward information, the location information, and the win-loss result. Thereby, the communication method receives the reward and the paying place when the game is played. It is not necessary for the players to decide the reward and the paying place with the mutual communication. The communication terminal can specifically image the reward and the paying place when the communication terminal accepts the match-type game of the bet from the another communication terminal.

A communication program executes the communication method described above with a computer. Thereby, the communication program allows that it is not necessary for the players to decide the reward and the paying place with the mutual communication. The players can specifically image the reward and the paying place when the match-type game is played with the communication terminals. The communication program can be installed into the general communication terminals without use of the special hardware.

A recording medium stores the communication program described above readable with the computer. Thereby, the recording medium can be distributed in the marketplace besides installing into the apparatus and allows ease of the upgrade.

According to a communication terminal of an embodiment of the present invention, game assigning means assigns a match-type game to play with the another communication terminal, opponent assigning means assigns an opponent to play the match-type game, reward assigning means assigns a reward for a result of the match-type game, paying place assigning means assigns a paying place of the reward, second transmitting means transmits match-type game information assigned by the game assigning means, opponent information assigned by the opponent assigning means, reward information assigned by the reward assigning means, location information of a reward paying place assigned by the paying place assigning means, second inputting means inputs to play the match-type game assigned by the game assigning means, and second win-loss result acquiring means acquires a win-loss result of the match-type game. Thereby, the communication terminal transmits the reward and the paying place when the game is played. It is not necessary for players to decide the reward and the paying place with the mutual communication. The communication terminal can specifically assign the reward and the paying place when the communication terminal requests the match-type game of the bet to the another communication terminal.

The reward paying place is a commercial facility, and second receiving means acquires information of the commercial facility capable of offering the reward. The paying place assigning means assigns the commercial facility based on the information received by the second receiving means which acquires the information of the commercial facility capable of offering the reward. Thereby, the communication terminal assigns the commercial facilities as the paying places. The players visit the pertinent commercial facility to pay the reward. Therefore the commercial facilities can increase the customers.

The second receiving means receives menu information of a goods or a service offered by the assigned commercial facility, and the reward assigning means assigns the goods or the service for the reward based on the menu information received by the second receiving means. Thereby, the communication terminal assigns the goods or the service offered by the assigned commercial facility as the reward of the bet game and increases sale of the commercial facility.

The information of the commercial facility capable of offering the reward sets category information, and includes the goods or the service set beforehand in the category as the menu information. Thereby, the communication terminal sets the category to select a minimum of the goods or the service as the menu without setting the goods or the service offered by the individual commercial facility.

The match-type game information is predetermined question information and correct answer information thereof, and the second input means inputs the predetermined question information and the correct answer information thereof. Thereby, the communication terminal questions the quiz for the bet as the match-type game to the another communication terminal.

The second inputting means inputs a correct answer message for the correct answer and an incorrect answer message for the incorrect answer to the predetermined question, and the second transmitting means transmits the correct answer message or the incorrect answer message with the match-type game information. Thereby, the communication terminal sets at will the correct answer message or the incorrect answer message to notify the correct answer or the incorrect answer for the quiz.

Second map data acquiring means acquires map data, second game record acquiring means acquires the location information and the win-loss result in the location information after the second win-loss result acquiring means acquires the win-loss result, and second outputting means outputs information indicating the win-loss result shown in the location of the location information on the map data based on the map data and the location information and the win-loss result acquired by the second game record acquiring means. Thereby, the communication terminal indicates an icon showing the win-loss result on the place assigned as the reward paying place on the map in order to confirm easily the matching result.

Second current location information acquiring means acquires current location information indicating one's own current location. The second game record acquiring means acquires the reward information, and the second outputting means outputs the win-loss information, the location information, and the reward information acquired by the second game record acquiring means when the distance between the current location information and the location information acquired by the second game record acquiring means is within a predetermined distance. Thereby, the communication terminal prompts the players to visit the facility when they are present near the reward paying place. When the reward paying place is the commercial facility, the commercial facility can increase the number of customers.

Second destination setting means sets a location indicated by location information as a destination when the win-loss result is acquired by the second win-loss result acquiring means, and second guiding means guides a path from the current location to the destination based on the map data. Thereby, the players can automatically visit the reward paying place when the win-loss result of the match-type game is obtained.

The second game record acquiring means acquires the opponent information, the second receiving means receives opponent location information indicating a location of the another communication terminal corresponding to the opponent information, and the second outputting means outputs information indicating the paying of the reward possible when the respective communication terminals are each other within the predetermined distance based on the current location information and the opponent location information. Thereby, the communication terminal notifies that the paying of the reward is possible when the players are present near each other.

The second outputting means outputs a notification to prompt an input of information whether the reward is paid or not based on the current location information and the opponent location information after the second win-loss result means acquires the win-loss result, and outputs information that the reward is paid when the second inputting means inputs information that the reward is paid. Thereby, the communication terminal prompts to input the information indicating the reward paying possible when the players are present near each other and the reward is not paid in order to prompt paying the reward.

The second receiving means receives information indicating a utilization status for a bet used for the match-type game at the location indicated by the location information, and the second outputting means outputs information indicating the utilization status for the bet used for the match-type game received by the second receiving means in the location indicated by the location information on the map data. Thereby, the communication terminal confirms the utilization status of the bet for the match-type game of the players with respect the respective locations.

An information processing apparatus communicably connected via a network to the communication terminal described above includes game content storing means for storing the match-type game information, the opponent information, the reward information, and the location information transmitted from the second transmitting means, and a second control unit for storing the information transmitted from the second transmitting means to the game content storing means and searching the associated information upon request from the second game record acquiring means. Thereby, the information processing apparatus registers the match-type game and the content of the match-type bet game and includes the record for reference. The information processing apparatus allows that the communication terminal needs not store the record of the game and have the large capacity of the memory device.

A communication method of an embodiment of the present invention includes a game assigning step for assigning a match-type game to play with the another communication terminal, an opponent assigning step for assigning an opponent to play the match-type game, a reward assigning step for assigning a reward as a result of the match-type game, a paying place assigning step for assigning a place to pay the reward, a second transmitting step for transmitting match-type game information assigned by the game assigning step, opponent information for notifying an opponent to play the match-type game assigned by the opponent assigning step, reward information assigned by the reward assigning step, and location information of the paying place of the reward assigned by the paying place assigning step, a second inputting step for inputting to play the match-type game assigned by the game assigning step, and a second win-loss result acquiring step for acquiring a win-loss result of the match-type game. Thereby, the communication terminal transmits the reward and the paying place when the game is played. It is not necessary for players to decide the reward and the paying place with the mutual communication. The players can specifically image the reward and the paying place when the match-type game is played with the communication terminals.

The communication program executes the communication method as described above with the computer. Thereby, it is not necessary for players to decide the reward and the paying place with the mutual communication. The players can specifically image the reward and the paying place when the match-type game is played with the communication terminals. Since the program is executed with the computer, the communication terminal may install the program without the hardware.

A recording medium stores the communication program as described above readable with the computer. Thereby, the recording medium can be distributed in the marketplace besides installing into the apparatus and allows ease of the upgrade.

[Embodiment 1]

Communication terminals 10, 20 and a server 30 of a first embodiment of the present invention are explained by referring to FIG. 1 to FIG. 15. FIG. 1 is an example showing the communication terminal 10 as a questioner terminal and the communication terminal 20 as an answerer terminal for a quiz of a match-type game.

The communication terminals 10, 20 are electronic devices such as smartphone, personal computer and the like connectable to a network. The server 30 has a database for storing information acquired by the communication terminals 10, 20 or information such as a match-type game result registered by the communication terminals 10, 20.

The communication terminal 10 includes an input unit 11, a microphone 12, a speaker 13, a display unit 14, a GPS 15, a voice recognition processing unit 16, a network communication unit 17, and a CPU 18.

The input unit 11 includes input means such as touch panel, keyboard or mouse for operating the communication terminal 10. The input unit 11 may include a number of input means.

The microphone 12 is used for inputting the quiz question with voice. The microphone 12 functions as game assigning means, opponent assigning means, reward assigning means, paying place assigning means, second inputting means, and second destination setting means. Each operation of the means is specified below in detail.

The speaker 13 outputs voice synthesized in the CPU 18 with input operations of the input unit 11 or the microphone 12.

The display unit 14 is configured with a liquid crystal display or an organic electro luminescence (EL) display to display a screen of the quiz question or map data. The display unit 14 functions as second outputting means. When the input unit 11 is the touch panel, the touch panel is superposed on the display unit 14.

The GPS 15 is a receiver for receiving radio waves from GPS (Global Positioning System) satellite. The GPS 15 calculates latitude and longitude of one's own location (communication terminal 10) based on information received from the GPS satellites, and outputs them to the CPU 18. The GPS 15 may only receive the information from the GPS satellites and the calculation of the latitude and longitude may be performed with the CPU 18. The GPS 15 functions as second current location information acquiring means.

The voice recognition processing unit 16 recognizes the voice input from the microphone 12 with a conventional voice recognition technology. When the recognized voice is an operation assignment to the communication terminal 10, the assignment is converted to data and is output to the CPU 18.

The network communication unit 17 communicates with the network connected to the communication terminal 10. The network communication unit 17 transmits the data from the CPU 18 to the network and outputs the data from the network to the CPU 18. The networks such as Internet or public network, not shown in FIG. 1, are provided between the communication terminal 10 and the communication terminal 20, between the communication terminal 10 and the server 30, and between the communication terminal 20 and the server 30. The network communication unit 17 functions as second transmitting means, second win-loss result acquiring means, second receiving means, second map data acquiring means, and second game record acquiring means.

The CPU 18 is a microcomputer including not only CPU (Central Processing Unit) also ROM (Read Only Memory) or RAM (Random Access Memory) for overall control of the communication terminal 10.

The communication terminal 20 has the same configuration as the communication terminal 10 as shown in FIG. 1. The communication terminal 20 as the answerer terminal has reference numerals differing from the communication terminal 10, but has the same functions as the communication terminal 10. The input operation related to the quiz answer is conducted with voice from the microphone 22 and the screen of the quiz answer and the map data is displayed on the display unit 24.

The microphone 22 functions as first inputting means and first destination setting means, the display unit 24 functions as first outputting means, the GPS 25 functions as first current location information acquiring means, the network communication unit 27 functions as first receiving means, game result outputting means, first transmitting means, first map data acquiring means, and first game record acquiring means, and the CPU 28 functions as first win-loss result acquiring means, first judging means, and first guiding means. Each operation of the means is described below.

The communication terminals 10, 20 can obtain the map data via the network from an external server storing the map data. The acquired map data are output from the network communication unit 17(27) to the CPU 18(28) and stored in a memory device not shown in FIG. 1. The communication terminals 10, 20 may store the map data beforehand.

FIG. 1 illustrates that the communication terminal 10 is the questioner terminal and the communication terminal 20 is the answerer terminal. The communication terminal 10 may function as the answerer terminal and the communication terminal 20 may function as the questioner terminal. The communication terminals 10, 20 may have functions of both the answerer and questioner terminal.

The server 30 includes a POI database 31, a friend information database 32, a game result detail database 33, a network communication unit 34, and a CPU 35. The server 30 functions as an information processing apparatus.

The POI database 31 registers location information of commercial facilities such as stores for paying commercial goods (hereafter referred to goods) or services obtained with the result of the quiz. POI (Point Of Interest) usually means a specific place where some feels convenient or interest place. In this embodiment, the POI indicates the commercial facilities capable of offering the goods or services as the result of the quiz.

FIG. 2 illustrates an example of the POI database 31. The POI database 31 includes POI ID, name, address, Zip code, phone number, rating, latitude (lat), longitude (lng), and menu (menu 1, menu 2, . . . ).

The POI ID is a number assigned uniquely to a single POI. The name is a name of facility or store of the POI. The address, the Zip code, and the phone number are related to the associated POI. The rating is a measure of reputation of the POI, for example, an average value of a number of evaluations. The latitude and longitude are related to the corresponding POI. The menu is a menu list of the goods or services offered by the POI.

The friend information database 32 is the database set by the communication terminals 10, 20 for registration as friends with information such as user ID, name or nickname, mail address, and phone number.

The game result detail database 33 is a database registering contents of the match-type game (quiz) between the communication terminals. FIG. 3 illustrates an example of the game result detail database 33. The present embodiment is a case where game result storing means is provided outside the communication terminals such as the server 30. The game result detail database functions as the game result storing means.

The game result detail database 33 registers information of game ID, question date (date (Q)), questioner, answer date (date (A)), answerer, question, correct answer, actual answer, correct or not (correct?), POI ID, goods to bet, paid date. The game result detail database 33 stores the information associated with the match-type game information, the opponent information, the reward information, the location information, and the win-loss result.

The game ID is the number uniquely assigned to one game (quiz). The question date and the questioner are related to the question date and the questioner (user ID) having the game ID for the quiz. The answer date and the answerer are related to the answer date and the answerer (user ID) for the quiz. The question is the content of the quiz (predetermined quiz question) set by the questioner. The correct answer is an answer or an option showing the correct answer set by the questioner. The actual answer is the content actually answered by the answerer. The correct? information is information indicating whether the answerer answers the correct or incorrect answer for the quiz. The POI ID is an identification of the store used in the quiz. The goods are the goods or the services assigned for the reward of the quiz. The paid date is the date when the goods or the service is paid.

The network communication unit 34 communicates with the network connected to the server 30. The network communication unit 34 transmits the data input from the CPU 35 to the network and outputs the data received from the network to the CPU 35.

The CPU 35 is a microcomputer including not only the CPU (Central Processing Unit) but also memory such as ROM (Read Only Memory) and RAM (Random Access Memory), and performs total control of the communication terminal 10. The CPU 35 of the present embodiment performs access control such as data registration or searching to the respective databases of the POI database 31, the friend information database 32, and the game result detail database 33. The CPU 35 functions as a first control unit.

The POI database 31, the friend information database 32, and the game result detail database 33 may be set in one memory device such as a hard disk drive. These databases may be set in the respective memory devices. One memory device may store two databases and another memory device may store the remaining databases.

Figure 4:
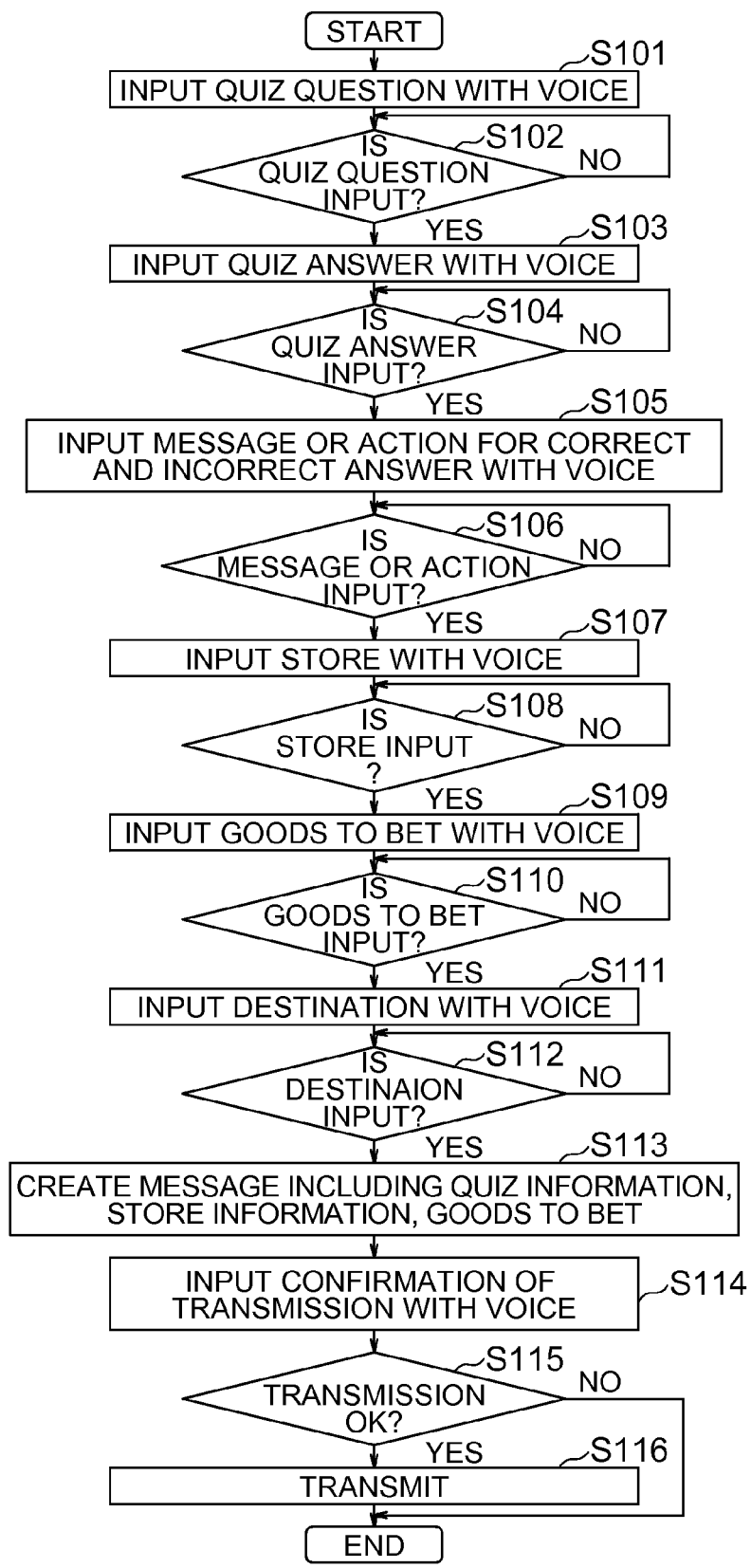
FIG. 4 is a flowchart showing an operation of a questioner terminal of FIG. 1.
Figure 5:
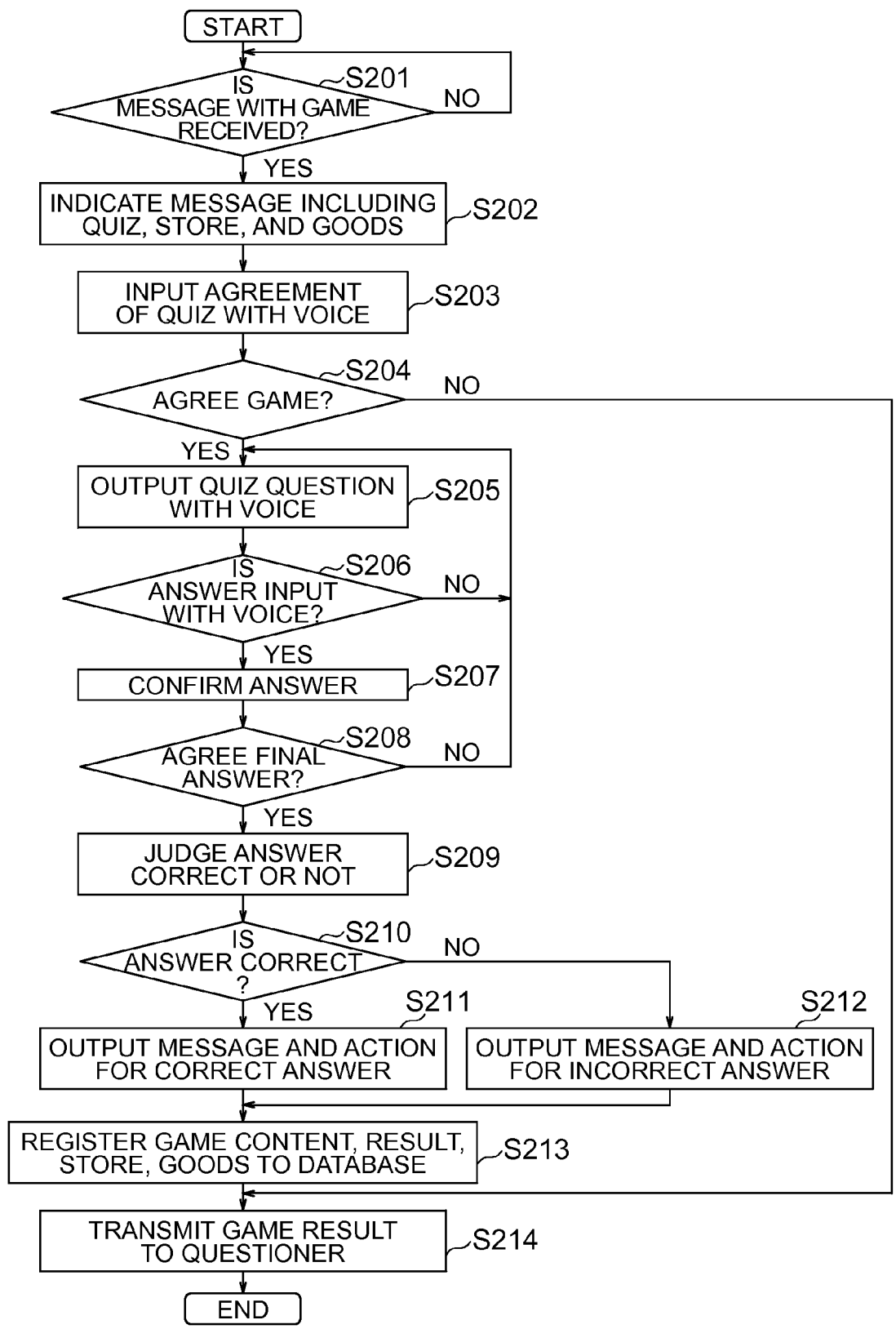
FIG. 5 is a flowchart showing an operation of an answerer terminal of FIG. 1.

FIG. 4 and FIG. 5 illustrate flowcharts of operations for setting the quiz from the communication terminal 10 to the communication terminal 20 through the server 30.

FIG. 4 illustrates the operation of the communication terminal 10 as the questioner. The flowchart of FIG. 4 is executed by the CPU 18.

In Step S101, the voice input for creating the quiz question is indicated, and the processing moves to Step S102. The speaker 13 outputs the guidance voice such as "Please create the quiz question with input of the voice. Please speak the quiz question". This step functions as a game assigning step for assigning the match-type game with the another communication terminal.

In Step S102, the processing judges whether the quiz question is input with the voice. When the voice input is performed (Yes), the processing moves to Step S103, and when the voice input is not performed (No), the processing stands by Step S102. When the voice recognition processing unit 16 recognizes the voice input from the microphone 12 without error, the voice input of the quiz question is performed.

In Step S103, the processing indicates the voice input of the quiz answer and moves to Step S104. In this step, the speaker 13 outputs the guidance voice such as "Please speak the correct answer of the quiz" to prompt the input of the correct answer of the quiz for the user. Step S103 and Step S101 function as a second inputting step to input the match-type game assigned by the game assigning means. In this embodiment, the input to play the match-type game in the questioner terminal is equivalent to setting or creating the quiz.

In Step S104, the processing judges whether the answer of the quiz is input with voice (Yes) or not (No). When the voice input is performed, the processing moves to Step S105, and when the voice input is not performed, the processing remains in Step S104. Judging of the voice input of the quiz answer is same as Step S102.

In Step S105, the processing indicates the voice input such as a message or an action for the correct and incorrect answer and moves to Step S106. In Step S105, the processing requests the user to input the respective messages for the correct answer and the incorrect answer for the quiz such as "Speak a message for the correct answer of the quiz" or "Speak a message for the incorrect answer of the quiz" of the voice guidance from the speaker 13.

The action specified in Step S105 is for example a performance such as assignment of sound effect performed simultaneously with the output of the correct or incorrect answer.

In Step S106, the processing judges whether the voice of the message or the action for the correct or incorrect answer is input. When the voice input is performed (Yes), the processing moves to Step S106, but the voice input is not performed, the processing remains in this step. Judging of the voice input of the message or the action for the correct or incorrect answer is same as Step S102 and Step S104.

Figure 6:
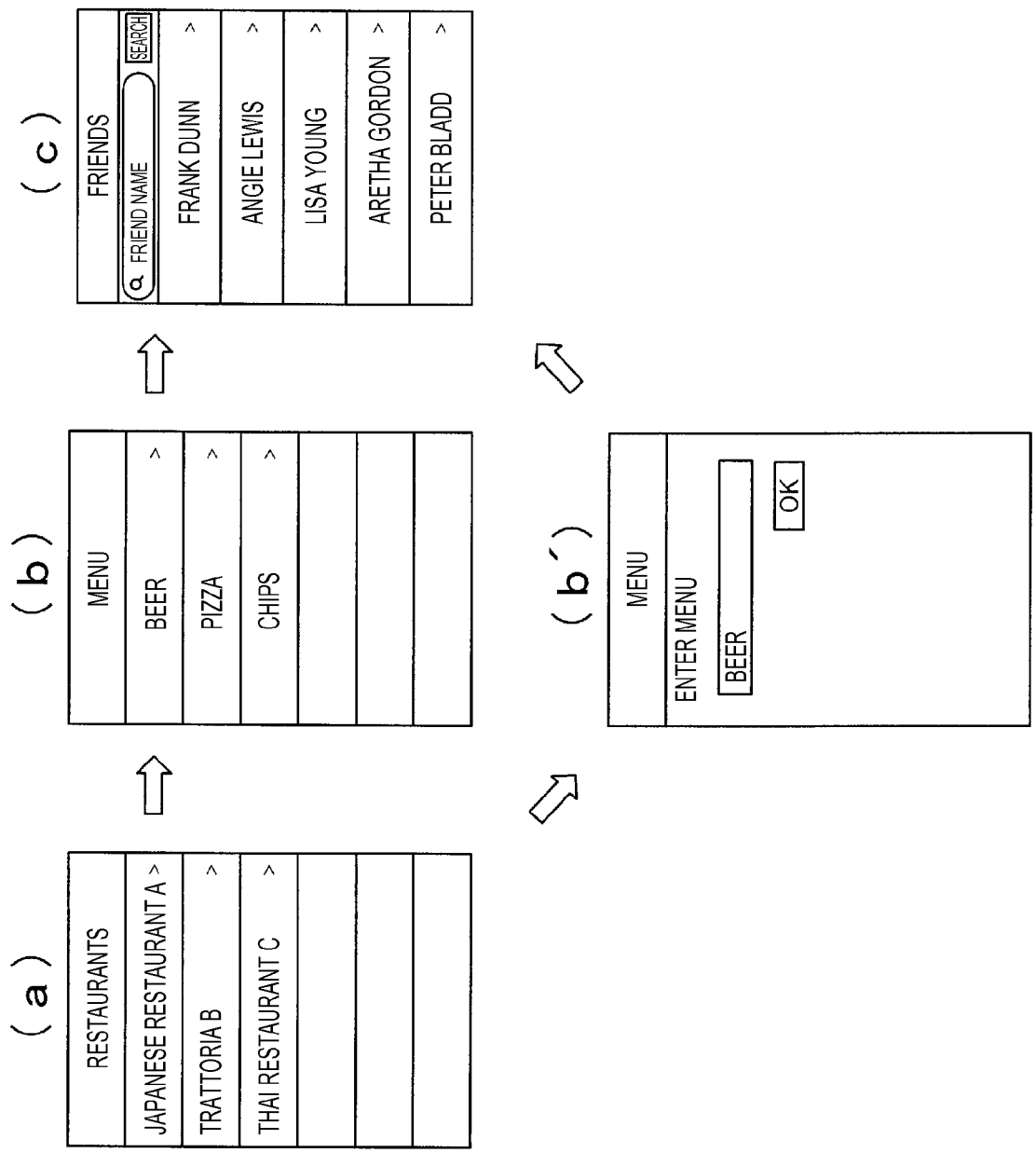
FIG. 6 is a diagram showing an example of a configuration of a screen for selection of a store and goods of the questioner terminal of FIG. 1.

In Step S107, the processing indicates the voice input such as a store and moves to Step S108. This step outputs the guidance voice from the speaker 13 such as "Please tell a name of the store to bet" to prompt the input of the store. This step selects the store offering the goods or the services as the reward from the win-loss of the quiz. The communication terminal 10 accesses the server 30 to acquire a list of stores (information about the commercial facilities capable of offering the reward) registered in the POI database 31, and shows the information on the display unit 14. FIG. 6 shows an example of the display unit 14 of this step.

With the execution of this step, the display unit 14 displays the list of the stores denoted as (a) in FIG. 6. The user selects the store from the list with the microphone 12. This step functions as a paying place assigning step to assign a paying place of the reward.

The stores registered in the POI database 31 of the server 30 are displayed. The user may display the stores of the POI database 31 based on certain criteria. The user may select the stores located within a predetermined area around the current location of the communication terminal 10. The stores may be selected from the relation with the location information of the GPS 15 or the POI database 31 informed by the user.

In Step S108, the processing judges whether the stores are input with voice. When the voice input is performed (Yes), the processing moves to Step S109, and when the voice input is not performed (No), the processing remains in this step. Judging of the voice input is same as Step S102, Step S104, and Step S106.

In Step S109, the processing indicates the voice input of the goods to bet and moves to Step S110. In this step, the speaker 13 outputs the guidance voice such as "Please select the goods to bet. Please tell the name of the goods to bet" to prompt the input of the goods to bet. This step selects the goods or the services offered as the reward for the win-loss of the quiz. The communication terminal 10 accesses the POI database 31 of the server 30, acquires the menu information of the store input by Step S107, and displays them on the display unit 14. FIG. 6 shows an example of the display unit 14 of this step. With execution of this step, the display unit 14 displays the goods or the services denoted as (b) in FIG. 6. The user inputs the name of the goods or services from the list with the microphone 12 to select them. This step functions as a reward assigning step to assign the reward offered as the result of the match-type game.

The menu displaying the goods or the services for selection is not limited to the respective stores registered in the POI database 31, but may show the POI database 31 as shown in FIG. 7. FIG. 7 shows the POI table, denoted as (a), including a subcategory and a main category with respect to FIG. 3 and FIG. 7 shows a menu table denoted as (b). The main category of the POI table includes a large category such as restaurant or event site. The subcategory includes a segmented category such as Italian or hamburger shop for the restaurant and theater or concert hall for the event site. The POI table includes the category information regarding the commercial facilities.

The menu table includes information such as category ID, menu (menu 1, menu 2, . . . ), and so on denoted as (b) in FIG. 7. The category ID is a number uniquely assigned to the respective main or subcategory. The menu is a menu list of the goods or the services offered by the main category or the sub category. The menu in the menu table includes the goods or the services more likely to be offered for each category. For example, coffee or beer is usually offered in the restaurant and is registered in advance. Thus, the user can select the goods or the services from the main category or the subcategory without registration of the menu of the respective stores in the POI table. For example, a store of p2001 for the POI ID in (a) of FIG. 7 has the main category of restaurant and the subcategory of Italian cuisine. Then, the beer, coffee, wine, and pizza are displayed without registration of the actual menu of the associated store.

Returning to the flowchart of FIG. 4, in Step S110, the processing judges whether the goods to bet is input with voice. If the voice input is performed (Yes), the processing moves to Step S111, and if the voice input is not performed, the processing remains in the current step. Judging of the voice input of the goods to bet is same as Steps S102, S104, S106, and S108.

In Step S111, the processing indicates the voice input of destination and moves to Step S112. This step outputs the guidance voice from the speaker 13 such as "Please specify a name of friend for the destination" to prompt the input of the destination. This step selects the friend as an opponent of the match-type game. The communication terminal 10 accesses the friend information database 32, acquires the list of the registered friends, and displays the data on the display unit 14. FIG. 6 shows an example of the display unit 14 denoted as (c) in the current step. With execution of this step, the display unit 14 displays the list of the friends denoted as (c) in FIG. 6. Then, the user selects the name of the friend from the list for the opponent of the match-type game with input from the microphone 12. This step functions as an opponent assigning step to assign the opponent of the match-type game.

In Step S112, the processing judges whether the destination is input with voice. If the voice input is performed (Yes), the processing moves to Step S113, but the voice input is not performed (No), the processing remains in the current step. Judging of the input of destination with voice is same as Steps S102, S104, S106, S108, and S110.

Figure 8:
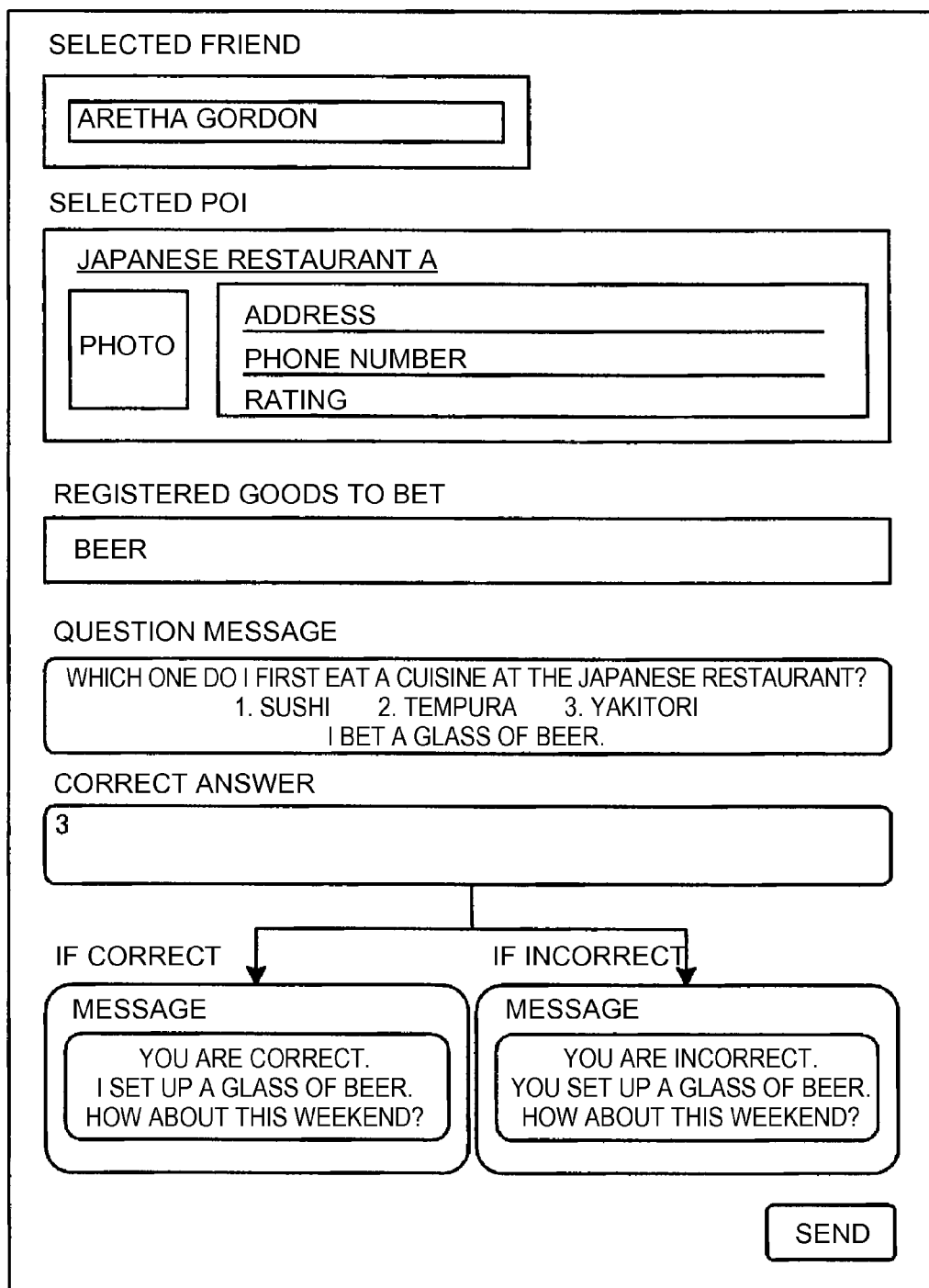
FIG. 8 is a diagram showing an example of a configuration of a screen for confirming a transmission in the questioner terminal of FIG. 1.

In Step S113, the processing creates a message including quiz information, store information, and the goods to bet and moves to Step S114. This step creates the message including the information such as the quiz, the store, the goods, and the service input by the above operation. The created message is displayed in the display unit 14 as shown in FIG. 8.

The quiz information (question information, correct answer information, message or action for the correct/ incorrect answer) corresponds to the match-type game information, the goods to bet corresponds to the reward information, the store information corresponds to the location information of the reward paying place. The opponent information corresponds to user ID and name of the questioner who creates the quiz with the questioner terminal. The store information of this embodiment may not only include the information of the location such as latitude, longitude, and place, but also the information to specify the commercial facility with the POI ID and the information of the store name, phone number, and evaluation.

In Step S114, the processing indicates the voice input for confirmation of transmission and moves to Step S115. In this step, the processing reads out the message created in Step S113 and requests allowance of the transmission to the user.

In Step S115, if the transmission is allowed (Yes), the processing moves to Step S116, and if not allowed (No), the processing ends. In this step, when the answer from the user in Step S114 is input as "Yes" with the microphone 12, the processing moves to Step S116 and ends. When the negative answer such as "No" is input, the processing ends without transmission. Step S116 functions as a second transmitting step to transmit the match-type game information assigned by the game assigning means, the opponent information notifying the opponent the match-type game assigned by the opponent assigning means, the reward information assigned by the reward assigning means, and the location information of the reward paying place assigned by the paying place assigning means.

The flowchart of FIG. 4 is not limited to the order of question creation, store selection, goods selection, and destination selection. For example, the store selection and the goods selection, or the destination selection may be executed on ahead. In other words, the order in FIG. 4 is optional.

The store selection in Step S107 is not limited to the simple selection from the list or the map data. The user may first assign the destination to determine the opponent, acquire the location information (opponent location information) of the opponent (communication terminal 20), and refine the facility within the predetermined area for both communication terminals based on the opponent location information and the one's own current location (communication terminal 10) from the GPS 15. This processing can assign the paying place easily accessible to each other. The user assigns the facility as the paying place within the predetermined area from the respective communication terminals.

In Step S111, the processing is not limited to indicate the list acquired from the friend information database 32 for selection of the destination. The processing may first assign the store and indicate the friends present within the predetermined area from the store and the one's own current location based on the store location information and the one's own location information (communication terminal 10) acquired from the GPS 15. The user may first assign the paying place and then assign the friend staying near the paying place as the opponent. The user assigns the other communication terminal within the predetermined area from the current location information and the paying place location information.

Furthermore, the selection of the store, the goods, and the destination is not limited to the list or the map data, but the user may directly input the related items denoted as (b') in FIG. 6.

FIG. 5 illustrates an operation of the communication terminal 20 as the answerer. The flowchart of FIG. 5 is executed with the CPU 28.

In Step S201, the processing judges whether the message with the game is received. If the message is received (Yes), the processing moves to Step S202, and if not received (No), the processing remains in the current step. Judgment of receiving the message with the game is performed with the communication terminal 20 which receives the message with the game transmitted from the communication terminal 10. Step S201 functions as a first receiving step to receive the match-type game information, the opponent information of the match-type game, the reward information obtained from the match-type game, the location information of the reward paying place.

In Step S202, the processing indicates the message including the quiz, the store information, and the goods to bet, and moves to Step S203. FIG. 9 shows an example of the message displayed in the display unit 24. This step shows a screen denoted as (a) in FIG. 9.

In Step S203, the processing indicates the user to agree the game with the voice input and moves to Step S204. In this step, for example, the speaker 23 outputs a voice guidance such as "The message with the quiz game is received from a friend, Bob. The store is Japanese restaurant A and the goods to bet is beer. If your answer is correct, you win beer from Bob, and if your answer is not correct, you give beer to Bob". The processing prompts the user to input agreement of the game.

In Step S204, the processing judges whether the user agrees the game. If the user agrees (Yes), the processing moves to Step S205, if not (No), the processing moves to Step S214. Judgment of the agreement or disagreement is performed by the input of "Yes" or "No" from the microphone 22.

In Step S205, the processing outputs the quiz question with voice and moves to Step S206. With the execution of this step, the display unit 24 displays the quiz question (Question Message) and an answer field (Enter Your Answer) denoted as (b) in FIG. 9. The display unit 24 functions as first outputting means for outputting the quiz question (predetermined question).

In Step S206, the processing judges whether the answer is input. If the answer is input (Yes), the processing moves to Step S207, and if not (No), the processing returns to Step S205. Judgment of the input of the answer is performed by the voice recognition processing unit 26 which recognizes the voice input from the microphone 22 without error. This step functions as a first inputting step for inputting performance of the match-type game indicated by the match-type game information.

In Step S207, the voice recognition processing unit 26 recognizes the answer input at Step S206. The processing moves to Step S208 after recognition of the input answer. In this step, the display 24 unit displays a message denoted as (c) in FIG. 9 with a voice guidance from the speaker 23 such as "Your answer is 3. Is this your final answer?" to request the user to confirm the answer.

In Step S208, the processing judges whether the user agrees or disagrees the answer. If the user agrees (Yes), the processing moves to Step S209, and if not (No), the processing returns to Step S205. Judgment of the agreement or disagreement is performed by the input of "Yes" or "No" from the microphone 22.

In Step S209, the voice recognition processing unit 26 recognizes the answer agreed at Step S208. The processing judges the answer to be correct or incorrect and moves to Step S210. In this step, the agreed answer (final answer) at Step S208 is compared with the correct answer included in the message with the game received at Step S201. This step functions as a first win-loss result acquiring step for acquiring the win-loss result of the match-type game after judging the answer correct or incorrect.

In Step S210, if the answer is correct (Yes), the processing moves to Step S211, if not (No), the processing moves to Step S212.

In Step S211, when the answer is correct with judgment at Step S210, the processing performs an indication of a message or an action of a correct answer and moves to Step S213. In this step, the processing indicates a screen denoted as (d) in FIG. 9, and outputs the voice guidance such as "The correct answer is 3. You win. Message from Bob (I set up a glass of beer. How about this weekend?)." and an effect sound such as a flourish from the speaker 23.

In Step S212, since the answer is not correct with judgment at step S210, the message or the action for the incorrect answer is processed and the processing moves to S213. In this step, the screen denoted as (d) in FIG. 9 is replaced for the incorrect answer in order to output the message or the action.

In Step S213, the processing registers the game content, the result, the store to bet, and the goods to the game result detail database 33 of the server 30 and moves to Step S214. This step functions as a game result outputting step for outputting the match-type game information, the opponent information, the reward information, the location information, and the win-loss result.

In Step S214, the processing transmits the game result to the questioner and ends. The processing may transmit the game result itself, or may transmit the game ID obtained at the registration of the game result to the server 30 at Step S213. The information may not be the game result, but may include any information from which the questioner can know the game result. The processing transmits the win-loss result information to the other communication terminal. When the user does not agree the game at Step S204, the processing transmits the message.

In the flowchart of FIG. 4 and FIG. 5, the quiz question or the answer is input with the voice from the microphone 12 for voice recognition, but the input can also be made with the input unit 11.

Figure 10:
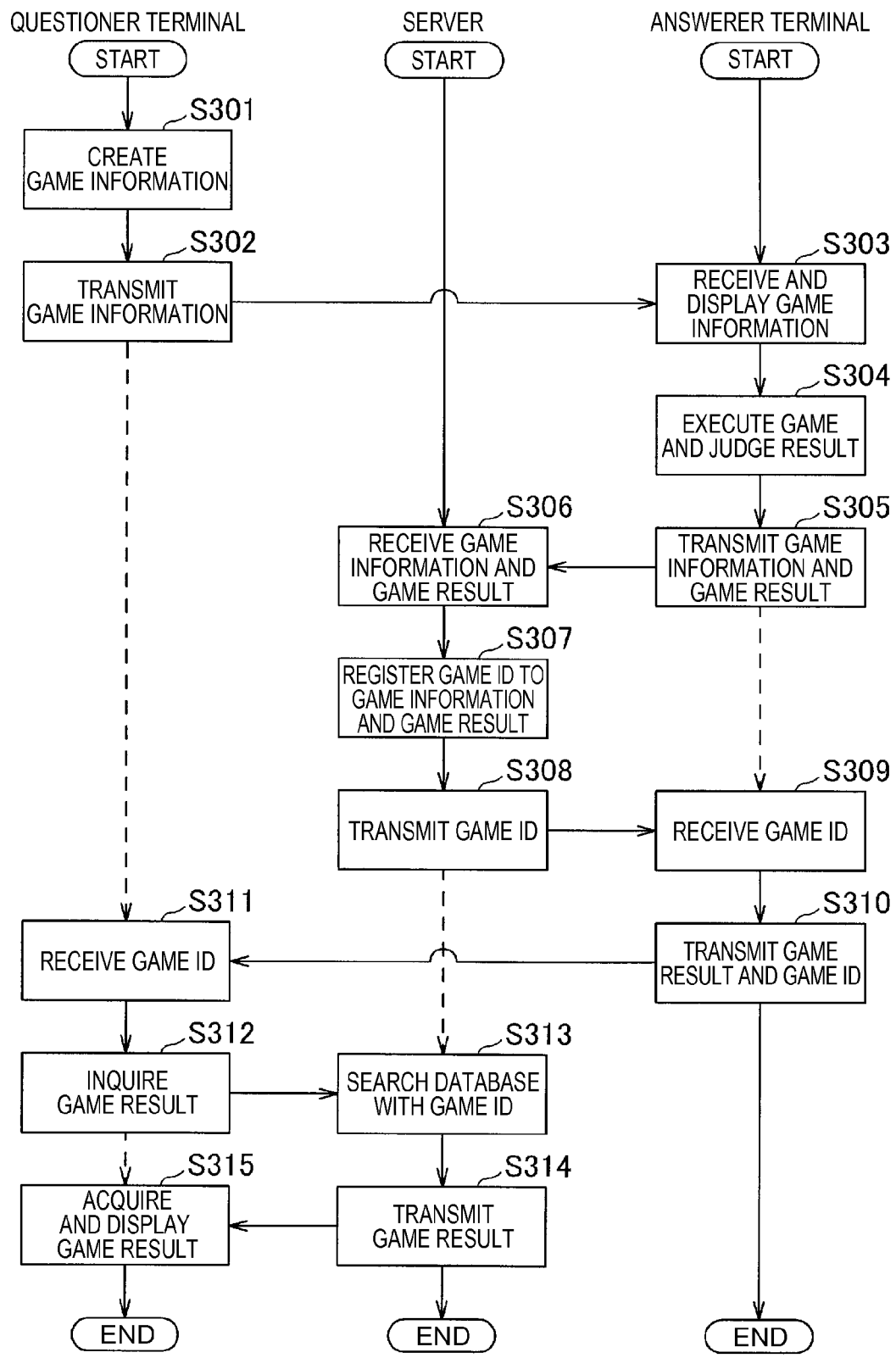
FIG. 10 is a flowchart showing an operation of the communication terminals and the server of FIG. 1 when the game is executed.

FIGS. 4 and 5 illustrate the operation of the communication terminals 10, 20. FIG. 10 illustrates mainly a flowchart of an operation of the server 30. The flowchart of FIG. 10 is executed with the CPU 18 (questioner terminal), the CPU 28 (answerer terminal), and the CPU 35 (server).

In Step S301, the questioner terminal (communication terminal 10) creates the game information including the quiz question, the answer, the message, the store information, the goods information, and the destination, and moves Step S302. Step S301 corresponds to Steps S101 to S113.

In Step S302, the processing transmits the game information created at Step S301 to the answerer terminal (communication terminal 20) and the step moves to Step S303. Step 302 corresponds to Steps S114 to S116 in FIG. 4. After execution of this step, the network communication unit 17 transmits the game information.

In Step S303, the answerer terminal receives the game information from the questioner terminal and displays it. The processing moves to Step S304. The network communication unit 27 receives the game information and Steps S201 to S202 in FIG. 5 are executed with the CPU 28.

In Step S304, the processing performs the game (quiz), judges the win-loss result (game result), and moves to Step S305. Thus, Step S304 corresponds to Steps S203 to S212.

In Step S305, the processing transmits the game information and the game result judged at Step S304 to the server 30 and moves to Step S306. In Step S305, Step S213 in FIG. 5 is executed, and the network communication unit 27 transmits the game information and the game result.

In Step S306, the server 30 receives the game information and the game result transmitted from the answerer terminal and the processing moves to Step S307. The network communication unit 34 receives the game information and the game result, and outputs them to the CPU 35.

In Step S307, the processing gives the game ID to the game information and the game result received at Step S306, registers them to the game result detail database 33, and moves to Step S308. As shown in FIG. 3, the game information (questioned date, questioner, answerer, question, correct answer, POI ID, goods) and the game result (answered date, actual answer, correct or not) are registered to each game ID.

In Step S308, the processing transmits the game ID allocated at Step S307 to the answerer terminal and moves to Step S309. The network communication unit 34 transmits the game ID.

In Step S309, the answerer terminal receives the game ID transmitted from the server 30 and moves to Step S310. The network communication unit 27 receives the game ID and transmits it to the CPU 28.

In Step S310, the answerer terminal transmits the message including the game result and the game ID to the questioner terminal and moves to Step S311. The message may not include the win-loss result of the game. The above step corresponds to the execution of Step S214 in FIG. 5 (transmission from the network communication unit 27).

In Step S311, the processing of the questioner terminal receives the message including the game ID and moves to Step S312. The network communication unit 17 receives the game ID and outputs it to the CPU 18.

In Step S312, the processing of the questioner terminal inquires the game result to the server 30 based on the game ID received at Step S311, and moves to Step S313. The network communication unit 17 transmits the game ID.

In Step S313, the processing of the server 30 searches the game result detail database 33 based on the game ID transmitted from the questioner terminal and moves to Step S314. The network communication unit 34 receives the game ID and the CPU 35 searches the game result detail database 33.

Next, in Step S314, the processing of the server 30 transmits the game result searched at Step S313 to the questioner terminal and moves to Step S315. The network communication unit 34 transmits the game result.

In Step S315, the questioner terminal acquires the game result from the server 30 and displays it in the display unit 14. The network communication unit 17 receives the game result and outputs it to the CPU 18 to show the game result in the display unit 14. The questioner terminal can know the game result and the answerer terminal can register the game information and the game result to the server 30. This step functions as a second win-loss result acquiring step for acquiring the win-loss result of the match-type game.

The flowcharts of FIG. 4, FIG. 5, and FIG. 10 illustrate explicitly the following constitution. The communication terminal 10 of the questioner terminal (applicant of bet) includes the game assigning means, the opponent assigning means, the reward assigning means, the paying place assigning means, the second transmitting means, the second inputting means, and the second win-loss result acquiring means. The communication terminal 20 of the answerer terminal (acceptor of bet) includes the first receiving means, the first inputting means, the first win-loss result acquiring means, and the game result outputting means.

In the flowchart of FIG. 10, the answerer terminal transmits notification of the game result to the questioner terminal after the answerer terminal performed the game. The server 30 may notify the game result to the questioner terminal after the server 30 updates the game result detail database 33 and transmits the game ID to the answerer terminal, namely after Step S308. The server 30 may perform Step S310.

FIGS. 11 to 14 illustrate operations of the communication terminals 10, 20 and the server 30 after completion of the game (quiz). The operations of the communication terminals 10, 20 are same after the game.

Figure 11:
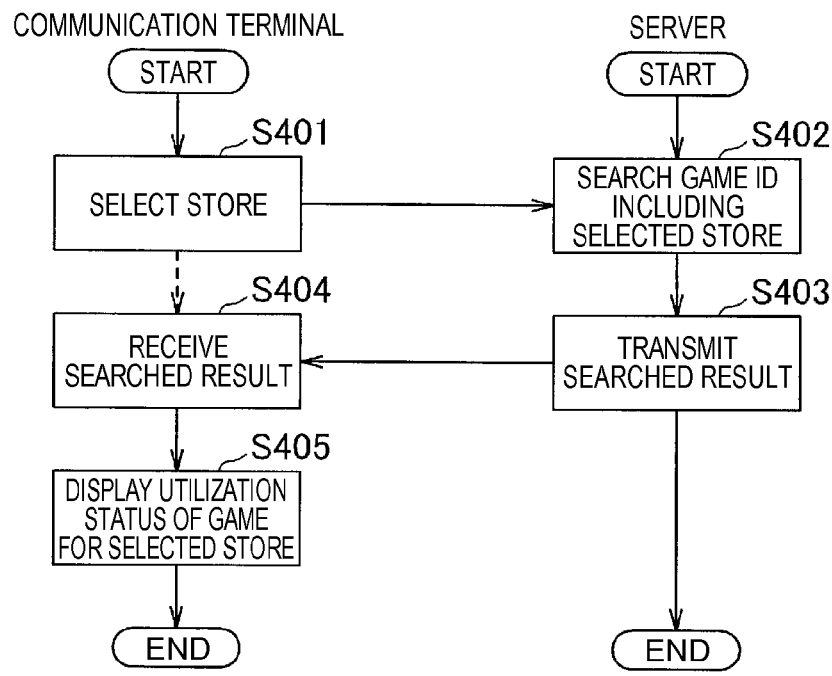
FIG. 11 is a flowchart of an operation showing a utilization status of the game at a selected store after the communication terminal and the server of FIG. 1 execute the game.

FIG. 11 illustrates an operation to confirm a utilization status of the store for the game (quiz). FIG. 11 is a flowchart to refer the utilization status of the game for any POI (store and the like). The flowchart of FIG. 11 is executed with the CPU 18 or 28 (communication terminal) and the CPU 35 (server).

In Step S401 of FIG. 11, the communication terminal 10 or 20 selects the store to confirm the utilization status of the game and moves to Step S402. The selection can be performed by displaying the map data in the display unit 14 and by selecting the location of the store on the map data, or by directly inputting the store with the input unit 11 or the microphone 12. The user may select a number of stores. The information of the selected stores is transmitted from the network communication unit 17 or 27 to the server 30.

In Step S402, the processing of the server 30 searches the game ID of the POI ID for the associated store selected at the communication terminal 10 or 20 from the game result detail database 33, and moves to Step S403. Extraction of the game ID including the specified POI ID from the game result detail database 33 shows the utilization status of the game for the POI ID (store). The network communication unit 34 receives the information such as the store. The CPU 35 searches the game result detail database 33 based on the information such as the store.

In Step S403, the processing of the server 30 transmits the searched result in Step S402 to the communication terminal 10 or 20, and the step moves to Step S404. The searched result is transmitted from the network communication unit 34.

In Step S404, the communication terminal 10 or 20 receives the result searched at the server 30 and moves to Step S405. The network communication unit 17 or 27 receives the searched result.

In Step S405, the display unit 24 displays the result (utilization status of the selected store) received at Step S404. The information of the store may only show the list, or displays the icon at the location of the associated store on the map to show the utilization status of the game and further the detailed information of the store when the icon is selected. The information, which shows the utilization status of the bet for the match-type game received by the first receiving means or the second receiving means, is output on the location indicated by the location information on the map data. The user and other user can confirm the utilization status of the game for the store to the match-type game every the location.

The store is selected in Step S401 of the flowchart of FIG. 11. The stores may be displayed by searching the stores (POI) within the predetermined area from the current location of the user (communication terminal 10 or 20). The stores may be selected from the area displayed in the map of the display unit 14.

Figure 12:
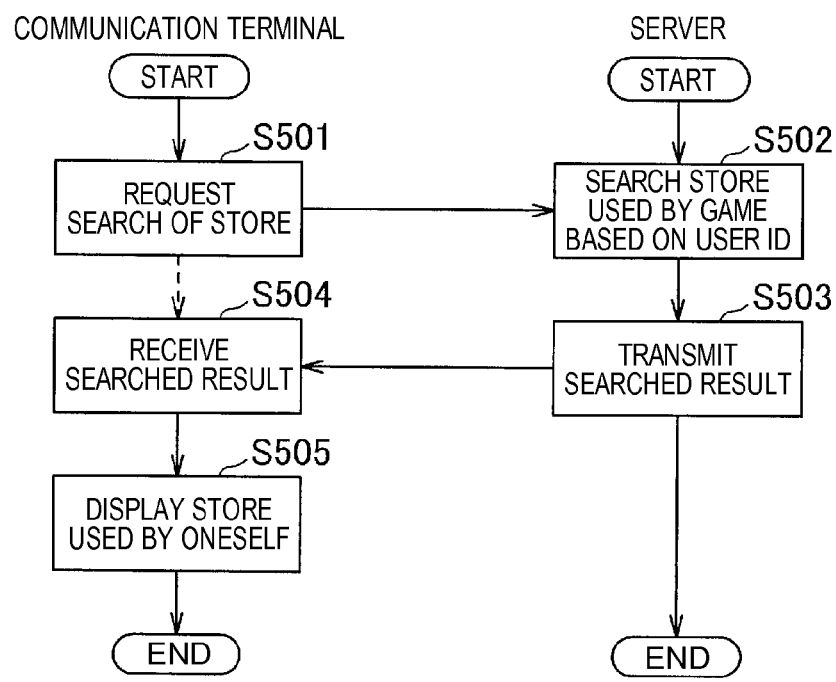
FIG. 12 is a flowchart of an operation showing the shop utilized by oneself after the communication terminal and the server of FIG. 1 execute the game.

FIG. 12 illustrates a flowchart to search the store used by the game (quiz) with the communication terminal 10 or 20. FIG. 12 is the flowchart to refer to the POI (store) used by the users for the game. The entry of the game means commitment of the questioner and the answerer. The search of either one can be assigned. The flowchart of FIG. 12 is executed with the CPU 18 or 28 (communication terminal) and the CPU 35 (server).

In Step S501 of FIG. 12, the processing of the communication terminal 10 or 20 indicates search of the store used by the game, and the step moves to Step S502. The searching indication information is transmitted from the network communication unit 17 or 27 to the server 30.

In Step S502, the server 30 searches the game ID including the user ID allocated to the related communication terminal (user) as the questioner or the answerer from the game result detail information database 33 based on the request from the communication terminal 10 or 20, and extracts the POI ID included in the searched game ID, and moves to Step S503. In this step, the processing searches the game ID including the specified user ID from the game result detail database 33 shown in FIG. 3 to specify the attended game and extracts the POI ID included in the searched game ID to extract the POI used by the specified user ID. The network communication unit 34 receives the searching indication information, and the CPU 35 searches the game result detail database 33 based on the user ID of the user who transmitted the searching indication information.

In Step S503, the processing transmits the searched result in Step S502 to the communication terminal 10 or 20, and the step moves to Step S504. The searched result is transmitted from the network communication unit 34. The searched result includes at least the location information (latitude and longitude) of the POI and the win-loss result.

In Step S504, the processing of the communication terminal 10 or 20 receives the searched result from the server 30 and moves to Step S505. The network communication unit 17 or 27 receives the searched result.

In Step S505, the result, such as the store used by oneself for the game, received in Step S504 is displayed in the display unit 24. In this step, the information showing the win-loss result is output in the location in the map data based on the map data and the location information and the win-loss result acquired by the first game record acquiring means (or the second game record acquiring means). The information may be displayed merely as the list, or the icon may be indicated in the map data to show the location of the utilized store denoted as (a) in FIG. 13. The icon may indicate a sign such as a white flag or a trophy to show the win-loss result, or indicate a detailed content when the icon is selected denoted as (b) in FIG. 13. The store used many times may have plural trophies and white flags.

When the location information of the acquired POI ID and the current location information obtained with the GPS 15 of one's own terminal are in the predetermined distance area, the map data may indicate the win-loss result and the merchandise information such as the goods and the services of the store indicated by the POI ID. The display unit may only display the game (quiz) in which the paying of the goods or the service is not completed. The display unit 14 may display the whole record of the store to identify the completion or incompletion of the paying. When the user is located near the paying place of the goods, the display unit can notify the possibility of the paying of the reward or the goods paid in the past.

Figure 14:
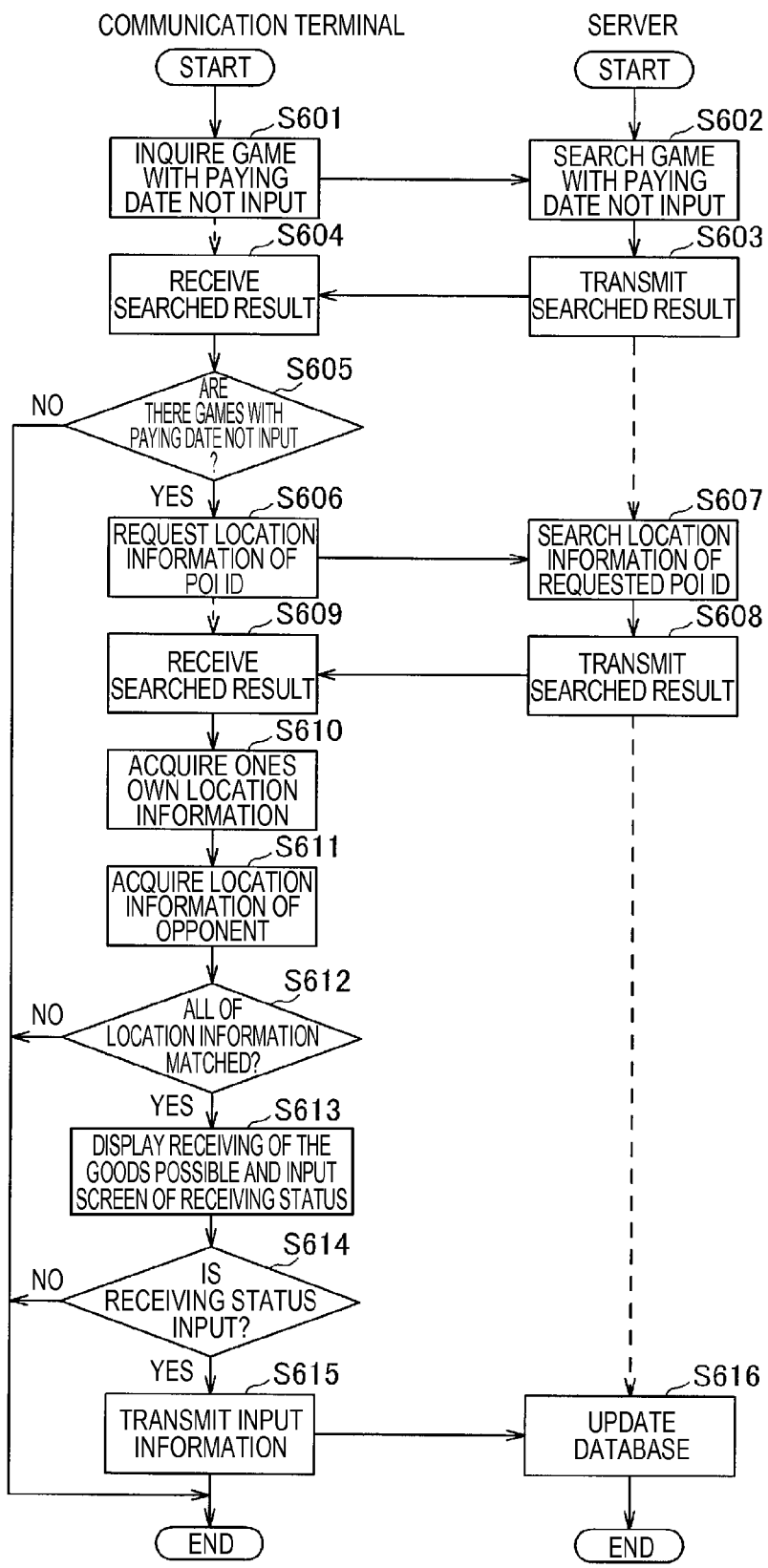
FIG. 14 is a flowchart showing an operation for inputting a paying status in the game with the paying date being not input after the communication terminal and the server of FIG. 1 execute the game.

FIG. 14 is a flowchart of an operation to notify that the goods or the service is not paid when the user is in the store with the opponent after the game. The flowchart of FIG. 14 is executed with the CPU 18 or 28 (communication terminal) and the CPU 35 (server).

In Step S601, the communication terminal 10 or 20 inquires the server 30 whether the paying date is input for some game (quiz), and moves to Step S602. The network communication unit 17 or 27 transmits the inquiring information to the server 30.

In Step S602, the server 30 searches the game result detail database 33 and the step moves to Step S603. In this step, the processing extracts the game ID in which the paying date is not input for the user ID in the game result detail database 33. The network communication unit 34 receives the inquiring information and the CPU 35 searches the game result detail database 33 based on the associated inquiring information.

In Step S603, the server 30 transmits the searched result executed in Step S602 and the processing moves to step S604. The searched result includes each item of the game result database 33 shown in FIG. 3. The network communication unit 34 transmits the searched result.

In Step S604, the communication terminal 10 or 20 receives the searched result transmitted from the server 30 and the processing moves to Step S605. The network communication unit 17 or 27 receives the searched result.

In Step S605, the processing judges whether the game without input of the paying date is left for the result received in Step S604. If the paying date is not input (Yes), the processing moves to Step S606, and if it is input (No), the processing ends.

In Step S606, the processing requests the location information of the POI ID such as the store used by the game, in which the paying date is not input, to the server and moves to Step S607. Since the result received in Step S604 includes the POI ID such as the store used by the game in which the paying date is not input, the processing extracts the POI ID included in the result and requests it to the server 30. The inquiring information is transmitted from the network communication unit 17 or 27 to the server 30.

In Step S607, the processing of the server 30 searches the location information of the requested POI ID from the POI database 31 and moves to Step S608. The network communication unit 34 receives the inquiring information and the CPU 35 searches the POI database 31 based on the searching indication information.

In Step S608, the processing transmits the searched result executed in Step S607 and moves to Step S609. The network communication unit 34 transmits the searched result.

In Step S609, the communication terminal 10 or 20 receives the searched result transmitted from the server 30 and the processing moves to Step S610. The network communication unit 17 or 27 receives the searched result.

In Step S610, the communication terminal 10 or 20 acquires one's own (communication terminal) location information from the GPS 15 and the processing moves to Step S611.

In Step S611, the processing acquires the location information (opponent location information) of the opponent (answerer or questioner) and moves to Step S612. The opponent location information can be acquired by transmitting the message requesting the location information of the opponent from the network communication unit 17 or 27 and by receiving the response of the message. Alternatively, the questioner and the answerer may periodically update the location information stored in the server 30. The location information of the opponent communication terminal is acquired by inquiring the server 30.

In Step S612, the processing judges whether all of the location information of the POI ID acquired in Step S609, the one's own location information acquired in Step S610, and the location information of the communication terminal of the opponent acquired in Step S611 agree. If all of them agree (Yes), the processing moves to Step S613, if not (No), the processing ends. When all of the location information agrees, it indicates that one's own and the opponent are in the store used by the game. Matching in this step is not limited to an exact match. For example, the above three locations may be in the predetermined distance area such as a 10 m radius.

In Step S613, the processing indicates the receiving of the goods possible and an input screen of the receiving status, and moves to Step S614. In this step, the processing displays the input screen of the receiving status and notifies at the same time that the receiving of the goods or the service is possible in order to prompt the input of the receiving status of the goods or the service. In this step, the processing only notifies the receiving of the goods or the service possible. The receiving status may be input with the communication terminal 10 or 20 lately at will. When the respective communication terminals are located within the predetermined distance based the current location information and the opponent location information, the processing outputs the notification to prompt the input of the information whether the reward is paid or not, or outputs the information indicating the paying of the reward possible.

In Step S614, the processing judges whether the receiving status is input with the input unit 11 or the microphone 12. If the input is performed (Yes), the processing moves to Step S615, if not (No), the processing ends. In this step, "no input" means the case refusing the input by deleting the input screen without waiting the input.

In Step S615, the processing transmits the information input in Step S614 to the server 30 and moves to Step S616. The network communication unit 17 or 27 transmits the input information.

In Step S616, the server 30 updates the game result detail database 33 based on the received information. More specifically, the paying date is set. The network communication unit 34 receives the information and the CPU updates the game result detail database 33 based on the received information.

In Step S613, the processing prompts the input of the receiving status. The receiving status is not limited to the direct input of the receiving date. The processing may display a click button indicating the completion of the paying and receiving. When the user clicks the button of the screen, the communication terminal 10, 20 or the server 30 may convert the clicking to the present date. In this flowchart, when all of the location information of the POI ID, the one's own location information, and the location information of the communication terminal of the opponent are matched, the processing indicates the receiving possible and the input of the receiving status. The matching may be judged from the one's own location information and the location information of the opponent communication terminal. The processing can notify that the paying and receiving of the goods or the service are possible when the match-type game users are present near each other.

The notification of the feasible paying of the goods or the service is not limited to the searching of the location information of the match-type game users. For example, when the communication terminal 10 or 20 has a navigation function for guiding from the current location or the predetermined location to the destination, and the destination is set as an action in the navigation function, the processing may display the information of the goods and the stores on a predetermined date such as the weekend or holiday for the game ID in which the paying date of the goods is not input, and at the same time automatically may guide the store assigned for the paying of the goods or the service as the destination of the navigation function. The CPU 18 (28) sets the path to the assigned destination.

The flowchart of FIG. 14 shows the operation to prompt the input of the paying date for the game in which the paying date is not input. The processing may indicate that the paying date is input after the input of the paying date is performed. For example, when the paying date is input, the size of the icon on the map may be reduced or the brightness thereof may be toned down to show the status of the input/non-input of the paying date. When the information indicating the reward paid is input, the processing may output the related information.

In this embodiment, the network communication unit 27 of the communication terminal 20 receives the quiz game information including the predetermined question and the answer, the sender, the goods or the services, and the store offering them from the communication terminal 10. The user of the communication terminal 20 inputs the answer of the quiz with the microphone 22, and the CPU 28 judges the answer is correct or not. Since the communication terminal 20 receives the paying location of the goods or the service when playing the game, it is not necessary to decide the paying place of the goods with mutual contact between the users. The answerer can specifically imagine the goods or the paying place thereof when the answerer receives the quiz to bet such as the match-type game from the communication terminal 10.

The paying place of the goods is the commercial facility such as the store. Since the commercial facility offers the goods or the service, the match-type game players go to the commercial facility after the quiz game, so that the commercial facility can gather customers.

The network communication unit 27 receives the correct message for the correct answer to the predetermined question and the incorrect message for the incorrect answer to the question. The display unit 24 outputs either the correct or incorrect message based on the answer after the CPU 28 judges the answer correct or not. The display unit 24 can notify the correct answer or the incorrect answer by outputting the correct or incorrect message assigned by the questioner at will. The questioner can include the message such as "I stand a glass of beer" related to the paying and receiving of the goods or the service for the correct or incorrect message.

The network communication unit 17 or 27 acquires the map data and registers the quiz result to the server 30 after completion of the quiz. The display unit 14 or 24 indicates the icon such as the trophy or the white flag showing the win-loss result on the location of the store used in the quiz concerned. The map data shows the win-loss result for easy confirmation.

The network communication unit 17 of the communication terminal 10 acquires the win-loss result and the CPU 28 of the communication terminal 20 acquires the win-loss result. When the respective communication terminals are located within the predetermined distance based on the one's own location information and the another communication terminal information, the display unit 14 or 24 outputs the notification to prompt the input of the information whether the goods or the service is paid. When the game players are located near each other and the goods or the service is not paid, the game players are requested to complete the paying of the goods or the service.

The network communication unit 17 or 27 receives the information indicating the utilization status of the bet used for the quiz at the store selected on the map data from the server 30. Since the display unit 14 or 24 displays the utilizing status of the store, the users can confirm the utilization status of each store.

The server 30 is communicably connected via the network with the communication terminal 20. The server 20 includes the game result detail information database 33 for storing the game information and the related result thereof output from the communication terminal 20, and the CPU 35 for registering the information output from the communication terminal 20 to the game result detail database and searching the associated information upon request from the communication terminal 20. The match-type game such as the quiz and the content of the bet for the match-type game can be registered in the server 30 and the record thereof can be referred. Since it is not necessary for the communication terminal 20 to have the record, the communication terminal 20 may have a small capacity recording medium.

The communication terminal 10 assigns the game, the opponent, the goods, and the reward paying store to the communication terminal 20 with the microphone 12. The communication terminal 10 creates the predetermined question and the answer with the microphone 12, and the network communication unit 17 transmits the question and the answer, the sender, the information of the goods and the store to the communication terminal 20. The network communication unit 17 acquires the win-loss result of the quiz from the server 30. The paying place of the goods or the service is transmitted with the quiz. Then, it is unnecessary for the users to contact each other for deciding the reward or the paying place. When the user applies the bet with the match-type game such as the quiz to the communication terminal 20, the user can specifically assign the goods to bet or the paying place thereof.

The commercial facilities are the paying places of the goods or the service. The network communication unit 17 acquires the information of the store, the display unit 14 displays its information, and the store for paying the goods or the service is assigned with the microphone 12. The commercial facility is assigned as the paying place. Since the match-type game players visit to the commercial facility to pay and receive the goods or the service, the commercial facility can get together the customer.

The network communication unit 17 receives the menu information related to the goods or the service offered by the assigned store, the display unit 14 displays the menu information, and the goods or the service of the reward is assigned with the microphone 12. Since the goods or the service offered by the assigned store is the reward as the result of the bet, the store can increase an amount of sale.

The questioner inputs the correct answer message for the correct answer and the incorrect answer message for the incorrect answer to the predetermined question from the microphone 12. The network communication unit 17 transmits the correct answer message and the incorrect answer message with the question and the answer of the quiz. Thus, the correct answer message and the incorrect answer message are set at will and can notify the answer of the quiz correct or incorrect. The correct answer message and the incorrect answer message may include the message about the paying of the goods such as "I stand a glass of beer" to explain more explicitly the content of the bet.

Figure 15:
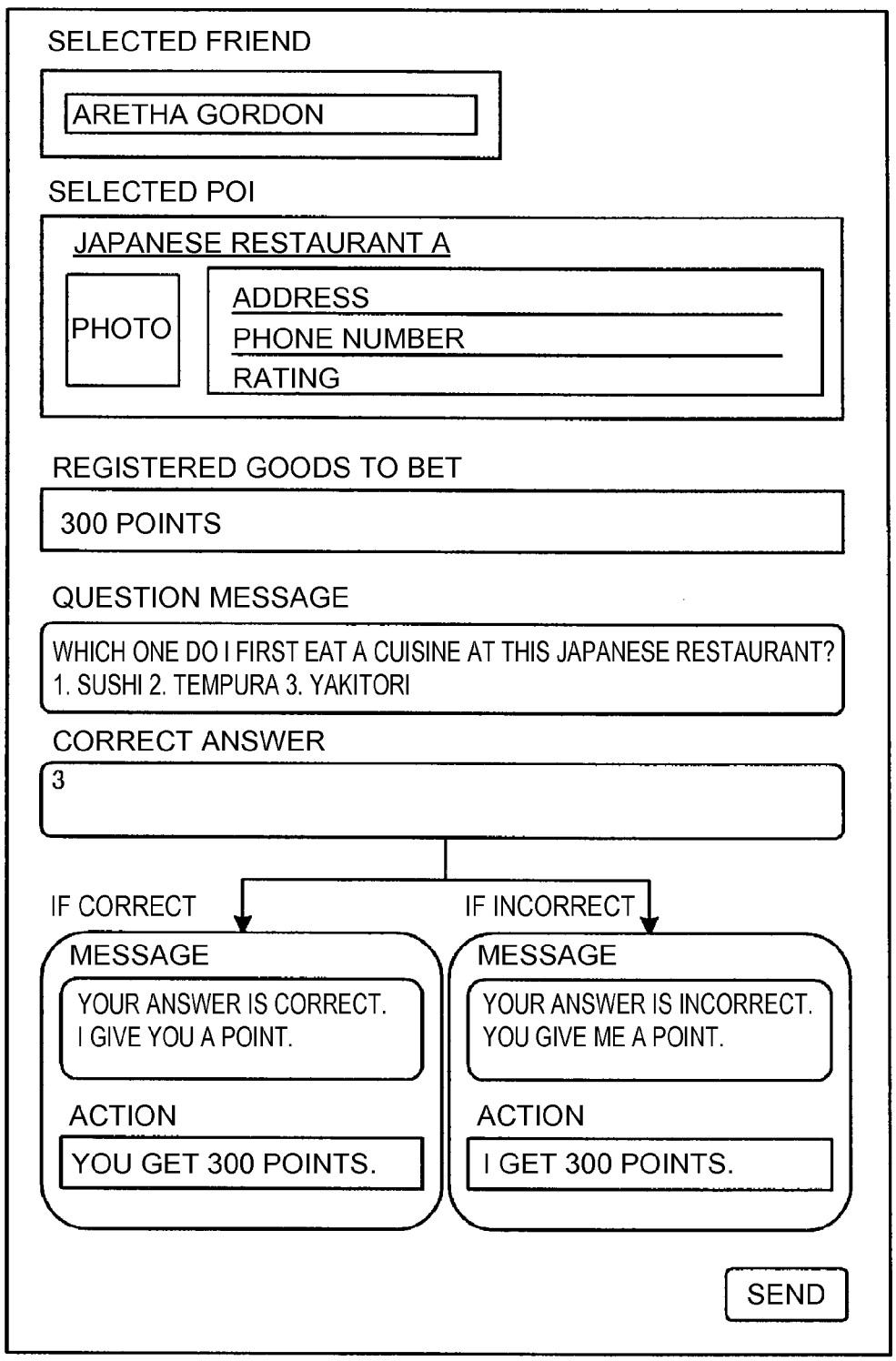
FIG. 15 is a diagram showing another example of a configuration in the screen for confirming a transmission of the questioner terminal of FIG. 1.

The above example explains mainly the goods such as beer for the reward obtained from the bet. The reward may be the service such as point service offered by the commercial facility. FIG. 15 is an example of the point service in place of the goods of FIG. 8. FIG. 15 indicates the point of 300 as the reward for the correct or incorrect answer to give or take the point for the correct or incorrect answer to the quiz. The players go to the commercial facility after the quiz and change the point. The reward to give or take may be a discount coupon usable at the commercial facility.

[Embodiment 2]

Figure 16:
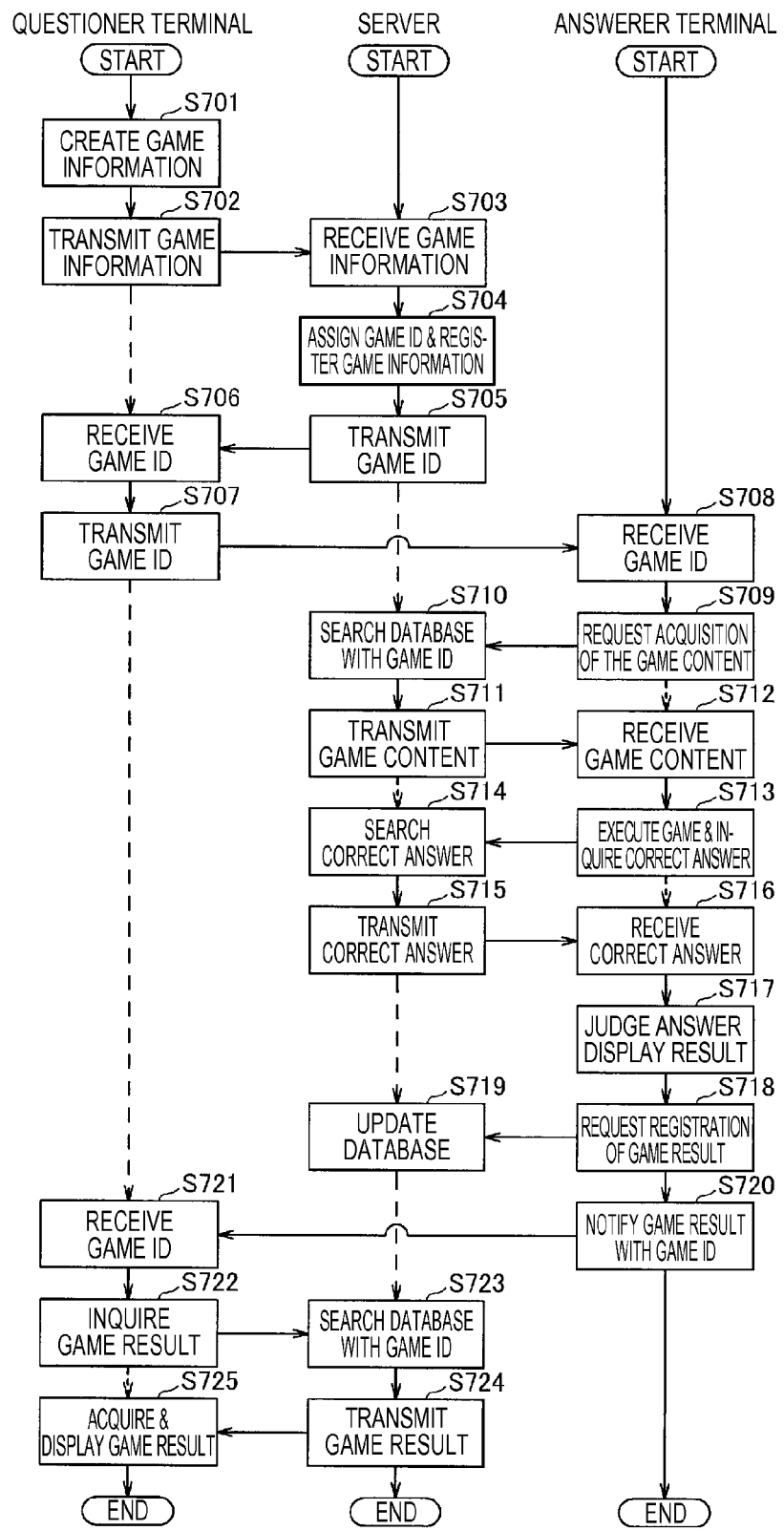
FIG. 16 is a flowchart showing an operation of the communication terminal and the server at the execution of the game of a second embodiment of the present invention.

FIG. 16 illustrates a communication terminal of a second embodiment of the present invention. Reference signs of components same as the first embodiment are referred to the same signs.

The communication terminals of the second embodiment are same as the first embodiment shown in FIG. 1, but the operation of registration to the server 30 is different. FIG. 16 illustrates the flowchart of an operations of a questioner terminal (communication terminal 10), an answerer terminal (communication terminal 20), and a server 30. The flowchart of FIG. 16 is executed with the respective CPU 18 (questioner terminal), CPU 28 (answerer terminal), and CPU 35 (server).

In Step S701, the processing of the questioner terminal creates game information such as a quiz question, an answer, a message, store information, goods information, and a destination, and moves to Step S702. This step executes the flowchart of FIG. 4. The transmission in Step S116 corresponds to Steps S702 to S707 described below, and transmits the message of application of a bet for the game (quiz) to the destination.

In Step S702, the questioner terminal transmits the game information created in Step S701 to the server 30, and the step moves to Step S703. The network communication unit 17 transmits the game information to the server 30. In this embodiment, the questioner terminal registers the game information to the game result detail database 33 of the server 30 when the game information is created. It is apparent that only the information created by the questioner terminal is registered and the information created by the answerer terminal is registered later. The game result detail database 33 functions as game content storing means, and the CPU 35 functions as a second control unit.

In Step S703, the server 30 receives the game information transmitted from the questioner terminal and the step moves to Step S704. The network communication unit 34 receives the game information from the questioner terminal.

In Step S704, the processing of the server 30 assigns a game ID to the game information received in Step S703, registers it to the game information detail database 33, and moves to Step S705. The game information (question date, questioner, answerer, question, correct answer, POI ID, goods) is registered to the respective game IDs as shown in FIG. 3.

In Step S705, the processing of the server 30 transmits the game ID allocated in Step S704 to the questioner terminal and moves to Step S706. The network communication unit 34 transmits the game ID to the questioner terminal.

In Step S706, the processing of the questioner terminal receives the game ID from the server 30 and moves to Step S707. The network communication unit 17 receives the game ID from the server 30.

In Step S707, the processing of the questioner terminal transmits the game ID received in Step S706 to the answerer terminal and moves to Step S708. The network communication unit 17 transmits the game ID to the answerer terminal. This step executes the transmission of the game to bet to the questioner terminal. In this embodiment, only the information of the game ID and the sender is transmitted to the answerer terminal without direct transmission of the game content as in the first embodiment.

In Step S708, the processing of the answerer terminal receives the game ID transmitted from the questioner terminal and moves to Step S709. The network communication unit 27 receives the game ID from the questioner terminal.

In Step S709, the processing of the answerer terminal requests acquisition of the game content (quiz question) of the game ID received in Step S708 to the server 30 and moves to Step S710. The network communication unit 27 transmits the game ID to the server 30.

In Step S710, the processing of the server 30 searches the game result detail database 33 with the game ID received from the answerer terminal and moves to Step S711.

In Step S711, the processing of the server 30 transmits the game content (quiz question) searched in Step S710 to the answerer terminal and moves to Step S712. The network communication unit 34 transmits the game content to the answerer terminal.

In Step S712, the processing of the answerer terminal receives the game content from the server 30 and moves to Step S713. The network communication unit 27 receives the game content from the server 30.

In Step S713, the processing of the answerer terminal executes the game, inquires the correct answer to the server 30, and moves to Step S714. This step executes the operation corresponding to Steps S201 to S208 of the flowchart of FIG. 5. In this step, the display unit 14 of the answerer terminal displays the request of the game, the game (quiz) content, the store information, the goods to bet, confirms acceptance of the game, and performs the voice output of the question, the voice input of the answer, and the confirmation of the answer. The network communication unit 27 inquires the correct answer to the server 30 for the game ID.

In Step S714, the processing of the server 30 searches the correct answer of the received game ID and moves to Step S715. The processing also searches the correct answer message or the incorrect answer message and the actions thereof besides the correct answer. The network communication unit 34 receives the inquired content and the CPU 35 searches the game result detail database 33.

In Step S715, the processing of the server 30 transmits the correct answer, the correct answer message or the incorrect answer message, and the actions thereof to the answerer terminal and moves to Step S716. The network communication unit 34 transmits the correct answer, the correct answer message or the incorrect answer message, and the actions thereof to the answerer terminal.

In Step S716, the processing of the answerer terminal receives the correct answer and so on from the server 30 and moves to Step S717. The network communication unit 27 receives the correct answer, the correct answer message or the incorrect answer message, and the actions thereof.

In Step S717, the processing of the answerer terminal judges whether the input answer is correct or not based on the correct answer received in Step S716, displays the judged result on the display unit 14, and moves to Step S718. This step executes the operations corresponding to Steps S209 to S212 of the flowchart of FIG. 5. This step executes the correct or incorrect judgment, displays the message set for the correct or incorrect answer, and processes the action thereof.

In Step S718, the processing of the answerer terminal transmits the game result to the server 30 for registration of the game result or the input answer judged in Step S717, requests the registration thereof to the game result detail database 33, and moves to S719 and Step S720. This step executes the operation corresponding to Step S213 of the flowchart of FIG. 5 and the network communication unit 27 transmits the game result to the server 30.

In Step S719, the processing of the server 30 registers the game result transmitted from the answerer terminal to the game result detail database 33 and updates the database. The network communication unit 34 receives the game result and the CPU 35 registers the game result to the game result detail database 33.

In Step S720, the processing of the answerer terminal transmits the message with the game ID to notify the game result to the questioner terminal and moves to Step S721. The message may not include the win-loss result of the game itself. This step executes Step S214 of FIG. 5. This step executes the operation corresponding to Step S214 of the flowchart of FIG. 5. The network communication unit 27 transmits the message that the game result is obtained.

In Step S721, the processing of the questioner terminal receives the message including the game ID transmitted from the answerer terminal and moves to Step S722. The network communication unit 17 receives the message including the game ID from the answerer terminal.

In Step S722, the processing of the questioner terminal requests the game result to the server 30 based on the game ID received in Step S721 and moves to Step S723. The network communication unit 17 transmits the inquiring information such as the game ID to the server 30.

In Step S723, the processing of the server 30 searches the game result detail database 33 based on the game ID transmitted from the questioner terminal and moves to Step S724. The network communication unit 34 receives the game ID and the CPU 35 searches the game result detail database 33.

In Step S724, the processing of the server 30 transmits the game result searched in Step S723 to the questioner terminal and moves to Step S725. The network communication unit 34 transmits the game result to the questioner terminal.

In Step S725, the processing of the questioner terminal acquires the game result from the server 30 and displays it on the display unit 14. The network communication unit 17 receives the game result and the CPU 28 processes the display unit 14 to display the game result. The questioner terminal recognizes the game result, and the game information and the game result are registered to the server 30 from the answerer terminal.

In the flowchart of FIG. 16, the answerer terminal transmits the notification of the game result to the questioner terminal after the answerer terminal answers the game result similar to the first embodiment. The server 30 may notify the game result to the questioner terminal after the server 30 updates the game result detail database 33 (after Step S719). The server may perform Step S720. The questioner terminal registers the game information to the server 30, receives the game ID from the server 30, and transmits the game ID to the answerer terminal. The server 30 may transmits the game ID to the questioner terminal and then (after Step S705) transmits the game ID to the answerer terminal. The server 30 may perform Step S707.

In the flowchart of FIG. 16, the answerer terminal inquires the correct answer of the game (quiz) to the server 30. The answerer terminal may receive the correct answer, the correct or incorrect answer message besides the game content (quiz content) at the same time when the answerer terminal acquires the game content (Step S712). In this case, Steps S713 to S716 are canceled.

The answerer terminal registers the game result to the server 30. The answerer terminal may transmit the game result to the questioner terminal and the questioner terminal registers the game result to the server 30.

In this embodiment, the server 30 is communicably connected via the network with the communication terminal 10. The server 30 includes the game result detail database 33 storing the information such as the match-type game information, the opponent information, the goods information, the store information transmitted from the communication terminal 10, and the CPU 35 registering the respective information transmitted from the communication terminal 10 to the game result detail database 33 and searching the game result upon request from the communication terminal. This construction is capable of registering the match-type game and the content of the bet for the match-type game to the information processing apparatus such as the server. Then, it is not necessary for the communication terminal to have the record and the communication terminal can reduce the capacity of the memory device.

The questioner terminal registers the game information to the server 30 and the answerer terminal accesses the server for the quiz. The questioner terminal can reduce the capacity of the message to the answerer terminal. The questioner terminal receives the necessary information from the server 30 and thus can reduce the quantity of the memory.

[Embodiment 3]

Figure 17:
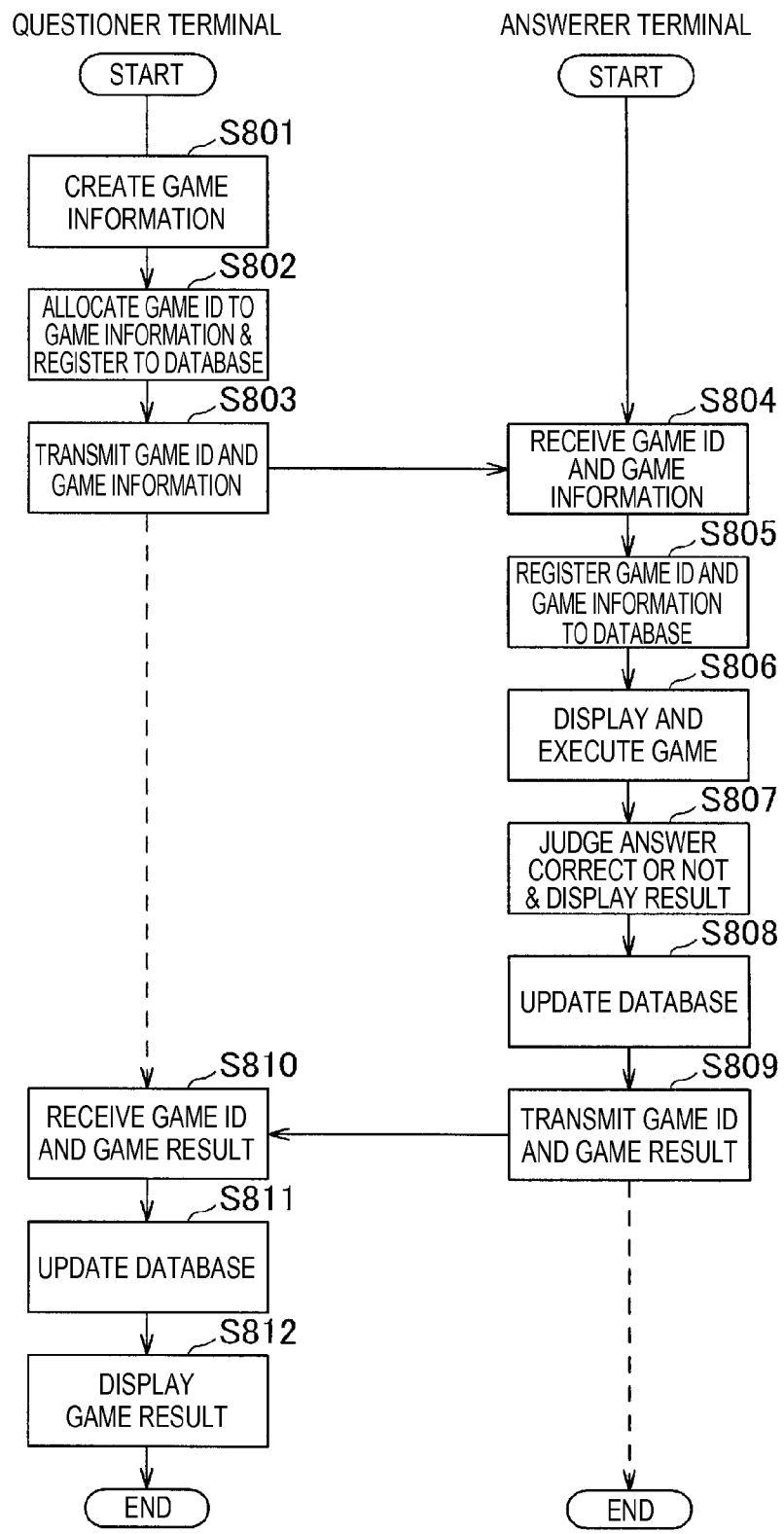
FIG. 17 is a flowchart showing an operation of the communication terminal and the server at the execution of the game of a third embodiment of the present invention.

FIG. 17 illustrates a flowchart of a third embodiment. The portions same as the first and the second embodiment are referred to the same reference signs.

This embodiment does not use the server 30 when the game is executed. Each communication terminal has a database equivalent to the game result detail database 33. The communication terminals include game result storing means. The POI database 31 and the friend information database 32 may be stored in the server outside of the communication terminals or may be stored in the respective communication terminals.

In Step S801, the processing of the questioner terminal creates the game information such as the quiz question, the answer, the message, the store information, the goods information, the destination and moves to Step S802. When the transmission in Step S116 in the flowchart of FIG. 4 is executed, Steps S802 and S803 are executed to transmit the message requesting the bet to the destination.

In Step S802, the processing of the questioner terminal allocates the game ID to the game information created in Step S801, registers it to the game result detail database (hereafter referred to questioner side database) of the own terminal, and moves to Step S803. The game information (question date, questioner, answerer, question, correct answer, POI ID, goods) is registered with respect to each game ID as shown in FIG. 3. The questioner side database only registers the information created by the questioner terminal. The information such as the result created by the answerer terminal is registered later. The game ID may include one's own time stamp and is requested to be a unique ID to the answerer terminal.

In Step S803, the processing of the questioner terminal transmits the game ID and the game information to the answerer terminal and moves to Step S804. Execution of this step transmits the message requesting the game of the bet to the answerer terminal. In this embodiment, the network communication unit 17 transmits the information with the game ID registered in the questioner side database to the answerer terminal.

In Step S804, the processing of the answerer terminal receives the game ID and the game information transmitted from the questioner terminal and moves to Step S805. The network communication unit 27 receives the game ID and the game information from the questioner terminal.

In Step S805, the processing of the answerer terminal registers the game ID and the game information received in Step S804 to the one's own game result detail database (hereafter referred to answerer side database) and moves to Step S806.

In Step S806, the processing of the answerer terminal displays and executes the game, and moves to Step S807. This step is equivalent to the operations of Steps S201 to S208 of FIG. 5. The display unit 14 of the answerer terminal displays the request of the game, the game (quiz) question, the store information, and the goods to bet, and requests the confirmation of agreement to the game, the voice output of the question, the voice input of the answer, and the confirmation of the answer.

In Step S807, the processing of the answerer terminal judges the answer correct or not, display the result, and moves to Step S808. In this step, the answerer terminal judges the answer input by the answerer whether the answer is correct or incorrect by searching the answerer side database, and displays the result on the display unit 24. This step executes the operations equivalent to Steps S209 to S212 of FIG. 5. The judgment of the answer, the message for the correct or incorrect answer, and the actions thereof are processed.

In Step S808, the processing of the answerer terminal updates the answerer side database based on the correct or incorrect result judged in Step S807 and the input answer, and moves to Step S809. This step executes the operation corresponding to Step S213 of the flowchart of FIG. 5.

In Step S809, the processing of the answerer terminal transmits the game ID and the game result (input answer, correct or incorrect result, answer date) to the questioner terminal and moves to Step S810. This step executes the operation corresponding to Step S214 of the flowchart of FIG. 5. The network communication unit 27 transmits the game ID and the game result to the questioner terminal.

In Step S810, the processing of the questioner terminal receives the game ID and the game result from the answerer terminal and moves to Step S811. The network communication unit 17 receives the game ID and the game result from the answerer terminal.

In Step S811, the processing of the questioner terminal updates the questioner side database based on the game ID and the game result received in Step S810 and moves to Step S812.

In Step S812, the processing of the questioner terminal displays the game result received in Step S810 on the display unit 14. The questioner terminal can recognize the game result, and both the questioner side database and the answerer side database are synchronized with the registered data.

In this embodiment, the communication terminals 10, 20 directly execute the game (quiz) without via the server. This construction enables the communication terminals to perform the betting game without the outside server executing the game or referring the record of the game.

The above three embodiments specify the case of the single answerer terminal. The questioner may question simultaneously to a plurality of answerers, that is, a plurality of answerer terminals. In this case, the game result detail database 33 assigns the individual game ID to the respective answerers.

The above three embodiments specify the case of the single quiz question, but may question a plurality of questions. In this case, the winner may be the answerer answering correctly all questions or at least half thereof. The win-loss can be determined for every question. The questioner may prepare a plurality of goods or services for the reward of the result of the bet. The number of the goods given to the answerer can be changed with the number of the correct answers. The goods or services can be graded up with increase of number of the correct answers. For example, the number of topping of pizza increases, wine grade increases, and earning point increases. The goods or the services may be changed for every question.

Specific example to change the goods or the service for each question provides different goods or service for each question, or changes the goods or the service depending on difficulty level set on each question.

The goods or the service for the reward of the bet may not be assigned by the questioner but may be recommended with consideration of the user's preference. If the commercial facility such as the store recommends the goods or the service with higher priority, they may be preferentially presented.

The questioner may transmit the created quiz to the server 30 and then the store or the goods recommended by the server with analysis of the quiz question may be presented to the questioner. The analysis of the quiz content is carried out by searching a specific word included in the quiz question from the category, the subcategory, and the menu of the POI database, or by searching a database including a relationship between the prescribed word and the store or the goods.

When the answerer does not desire the goods or the service as the reward assigned by the questioner, the answerer may change the goods or the service. In this case, the answerer needs an operation to acquire acceptance of the questioner. The questioner may transmit the plurality of commercial facilities or the goods for the answerer to select by oneself.

In the three embodiments described above, when the questioner wins the game (the answer is incorrect), the answerer stands the reward to the questioner (the questioner receives the goods assigned by the questioner) and when the answerer wins the game (the answer is correct), the questioner stands the reward to the answerer (the answerer receives the goods assigned by the questioner). However, the answerer may assign the goods.

In the above case, the questioner assigns a goods a of a store A and questions to the answerer, the answerer assigns a goods b of the store A and replies to the questioner, and the answerer tries the quiz after acceptance of the questioner. Then, when the questioner wins the game, the questioner obtains the goods b assigned by the answerer, and when the answerer wins the game, the answerer obtains the goods a assigned by the questioner. It is appreciated that the questioner may obtain the goods a assigned by the questioner when the questioner wins the game and the answerer may obtain the goods b assigned by the answerer when the answerer wins the game. In this example, the store is same but may be different.

The questioner and the answerer may be exchanged with each question of the game. The answerer responses the incorrect answer for the first quiz, the next answerer responses the incorrect answer for the next quiz, and the game becomes draw, so that the reward paying for the bet becomes invalid. For the draw game, it is not limited to the above case. The questioner questions two questions, and when the answerer replies one answer correct and another answer incorrect, the bet becomes draw.

The individual user questions the quiz to the friend, but persons involved in the commercial facility may question the quiz to an unspecified number of users. When the user wins the game, the user receives the goods or the service available at the commercial facility.

The reward such as the goods for the bet may be at least given to the answerer accepting the bet. When the answerer replies the incorrect answer, the answerer needs not give any reward to the questioner and does not simply receive any reward.

The embodiments indicate the match-type game of the quiz but may include the win-loss match-type game such as card game or puzzle game. The game system is not limited to the communication terminals installing the game but may be performed by the communication terminals accessing the server installing the game.

The embodiments assigns the place (POI) paying the reward to the commercial facility and the goods or the service offered by the commercial facility as the reward. The POI may be assigned to a public facility such as a park or a private home and the reward may be possession (book or CD) or home cooking of the questioner.

The embodiments utilize the following communication terminals 10, 20 and the communication method.

[Appendix 1]

A communication terminal 20 communicably connected via a network to at least one another communication terminal 10, the communication terminal 20 comprising: a network communication unit 27 for receiving match-type game information, opponent information, reward information, and location information of a reward paying place from the another communication terminal 10; a microphone 22 for inputting acceptance of the match-type game in the match-type game information acquired by the network communication unit 27; a CPU 28 for acquiring a win-loss result of the match-type game; and the network communication unit 27 for outputting the match-type game information, the opponent information, the reward information, the location information, and the win-loss result.

[Appendix 2]

A communication method of a communication terminal 20 communicably connected via a network to at least one another communication terminal 10, the method comprising: Step S201 for receiving match-type game information, opponent information, reward information, and location information of a reward paying place from the another communication terminal 10; Step S206 for inputting acceptance of the match-type game in the match-type game information received in Step S201; Step S209 for acquiring a win-loss result of the match-type game; and Step S213 for outputting the match-type game information, the opponent information, the reward information, the location information, and the win-loss result.

According to the communication terminal 20 and the communication method, the communication terminal 20 receives the reward and the paying place when the game is played. It is not necessary for players to decide the reward and the paying place with the mutual communication. The communication terminal 20 can specifically image the reward and the paying place when the communication terminal 20 accepts the match-type game of the bet from the communication terminal 10.

[Appendix 3]

A communication terminal 10 communicably connected via a network to at least one another communication terminal 20, the communication terminal comprising: a microphone 12 for assigning a match-type game to play with the another communication terminal 20; the microphone 12 for assigning an opponent to play the match-type game; the microphone 12 for assigning a reward for a result of the match-type game; the microphone 12 for assigning a paying place of the reward; a network communication unit 17 for transmitting match-type game information assigned by the microphone 12, opponent information assigned by the microphone 12, reward information assigned by the microphone 12, location information of a reward paying place assigned by the microphone 12; the microphone 12 for inputting to play the match-type game assigned by the microphone 12; and the network communication unit 17 for acquiring a win-loss result of the match-type game.

[Appendix 4]

A communication method of a communication terminal 10 communicably connected via a network to at least one another communication terminal 20, the communication method comprising: Step S101 for assigning a match-type game to play with the another communication terminal 20; Step S111 for assigning an opponent to play the match-type game; Step S109 for assigning a reward as a result of the match-type game; Step S107 for assigning a place to pay the reward; Step S116 for transmitting match-type game information assigned by Step S101, opponent information for notifying an opponent to play the match-type game assigned by Step S111, reward information assigned by Step S109, and location information of the paying place of the reward assigned by Step S107; Step S101 and Step S103 for inputting to play the match-type game assigned by Step S101; and Step S315 for acquiring a win-loss result of the match-type game.

According to the communication terminal 10 and the communication method, the communication terminal 10 transmits the reward and the paying place when the game is played. It is not necessary for players to decide the reward and the paying place with the mutual communication. The communication terminal 10 can specifically assign the reward and the paying place when the communication terminal 10 requests the match-type game of the bet to the communication terminal 20.

The embodiments described above are only examples of the present invention and are not limited to the examples. Any modifications of the present invention are within the scope without departing the scope of the present invention.

REFERENCE SIGNS LIST 10 communication terminal
12 microphone (game assigning means, opponent assigning means, reward assigning means, paying place assigning means, second inputting means, second destination setting means)
14 display unit (second outputting means)
15 GPS (second current location information acquiring means)
17 network communication unit (second transmitting means, second win-loss result acquiring means, second receiving means, second map data acquiring means, second game record acquiring means)
18 CPU (second guiding means)
20 communication terminal
22 microphone (first inputting means, first destination setting Means)
24 display unit (first outputting means)
25 GPS (first current location information acquiring means)
27 network communication unit (first receiving means, game result outputting means, first transmitting means, first map data acquiring means, first game record acquiring means)
28 CPU (first win-loss result acquiring means, first judging means, first guiding means)
30 server (information processing apparatus)
33 game result detail database (game result storing means, game content storing means)
35 CPU (first control unit, second control unit)
S101 INPUT QUIZ QUESTION WITH VOICE (game assigning step, second inputting step)
S103 INPUT QUIZ ANSWER WITH VOICE (second inputting step)
S107 INPUT STORE WITH VOICE (paying place assigning step)
S109 INPUT GOODS TO BET WITH VOICE (reward assigning step)
S111 INPUT DESTINATION WITH VOICE (opponent assigning step)
S116 TRANSMIT (second transmitting step)
S201 IS MESSAGE WITH GAME RECEIVED? (first receiving step)

S206 IS ANSWER INPUT WITH VOICE? (first inputting step)
S209 JUDGE ANSWER CORRECT OR NOT (first win-loss result acquiring step)
S213 REGISTER GAME CONTENT, RESULT, STORE, GOODS TO DATABASE (game result outputting step)
S315 ACQUIRE AND DISPLAY GAME RESULT (second win-loss result acquiring step)

The invention claimed is:

1. A communication terminal communicably connected via a network to at least one another communication terminal, the communication terminal comprising:
   a receiver configured to receive opponent information, match-type game information, reward information, and reward paying place information for the match-type game;
   an inputter configured to input acceptance of the match-type game;
   win-loss result acquirer configured to acquire a win-loss result of the match-type game;
   an outputter configured to output the opponent information, the match-type game information, the reward information, the reward paying place information, and the win-loss result;
   an opponent assignor configured to assign an opponent to play the match-type game;
   a reward assignor configured to assign a reward for a result of the match-type game;
   a paying place assignor configured to assign a paying place of the reward; and
   a transmitter configured to transmit opponent information to play the match-type game with the opponent assigned by the opponent assignor, reward information assigned by the reward assignor, and reward paving place information assigned by the paving place assignor,
   wherein the receiver is configured to receive map data, and the outputter is configured to output information indicating the win-loss result on the reward paying place on the map,
   wherein the opponent to play the match-type game assigned by the opponent assignor and the reward for the result of the match-type game by the reward assignor are decided before starting the match-type game,
   wherein the match-type game is a win-loss match-type game, and is performed by a user and the opponent assigned by the opponent assignor,
   wherein the win-loss result of the match-type game includes a win-loss result of a bet for win-loss result of the match-game, and
   wherein when the opponent is assigned by the opponent assignor, the outputter is configured to output information for confirming whether or not the opponent agrees to the match-type game based on the opponent information, the match-type game information, and the reward information received in the receiver.

2. The communication terminal as claimed in claim 1, further comprising a current location information acquirer configured to acquire location information indicating one's own current location,
   wherein the outputter is configured to output the win-loss result, the reward paying place, and the reward information when a distance between the current location information and the reward paying place is within a predetermined distance.

3. The communication terminal as claimed in claim 2, wherein the receiver is configured to receive an opponent location information indicating a location of the another communication terminal corresponding to the opponent information, and the outputter is configured to output information indicating the paying of the reward possible when the communication terminals are within the predetermined distance based on the current location information and the opponent location information.

4. The communication terminal as claimed in claim 3, wherein the outputter is configured to output notification to prompt input of information whether the reward is paid or not when the respective communication terminals are present within the predetermined distance based on the current location information and the opponent location information after the first win-loss result acquirer acquires the win-loss result, and outputs information indicating the reward paid when the information indicating the reward paid is input by the inputter.

5. The communication terminal as claimed in claim 1, wherein the outputter is configured to output information indicating a utilization status of a bet for the match-type game on the location of the reward paying place on the map data.

6. An information processing apparatus communicably connected via a network to the communication terminal as claimed in claim 1, the information processing apparatus comprising:
   a storage configured to store the opponent information, the reward information, the location information, and the win-loss result output by the outputter; and
   a controller is configured to store each information output by the outputter to the storage and for searching each information upon request from the acquirer.

7. A communication method of a communication terminal communicably connected via a network to at least one another communication terminal, the method comprising:
   a receiving step for receiving opponent information, match-type game information, reward information, and reward paying place information for the match-type game;
   a inputting step for inputting acceptance of the match-type game;
   a win-loss result acquiring step for acquiring a win-loss result of the match-type game;
   an outputting step for outputting the opponent information, the match-type game information, the reward information, the reward paying place information, and the win-loss result;
   an opponent assigning step for assigning an opponent to play the match-type game;
   a reward assigning step for assigning a reward for a result of the match-type game;
   a paying place assigning step for assigning a paying place of the reward; and
   a transmitting step for transmitting opponent information to play the match-type game with the opponent assigned h the opponent assigning step, reward information assigned by the reward assigning step, and reward paying place information assigned by the paying place assigning step,
   wherein the receiving step receives map date, and the outputting step outputs information including the win-loss result on the reward paying place on the map,
   wherein the opponent to play the match-type game assigned by the opponent assigning step and the reward for the result of the match-type game by the reward assigning step are decided before starting the match-type game, wherein the match-type game is a win-loss match-game, and is performed by a user and the opponent assigned by the opponent assigning step, wherein the win-loss result of the match-type game includes a win-loss result of a bet for win-loss result of the match-type game, and when the opponent is assigned by the opponent assigning step, the outputting step outputs information for confirming whether or not the opponent agrees to the match-type game based on the opponent information, the match-type game information, and the reward information received in the receiving step.

8. A communication program executing the communication method as claimed in claim 7 with a computer.

9. A recording medium storing the communication program as claimed in claim 8 readable with the computer.

10. The communication terminal as claimed in claim 1, wherein the reward paying place is a commercial facility, and the receiver is configured to receive information of the commercial facility capable of offering the reward, and wherein the paying place assignor is configured to assign the commercial facility based on the information received by the receiver which acquires the information of the commercial facility capable of offering the reward.

11. The communication terminal as claimed in claim 10, wherein the receiver is configured to receive menu information of a goods or a service offered on the assigned commercial facility, and the reward assignor is configured to assign the goods or the service for the reward based on the menu information received by the receiver.

* * * * *